(12) United States Patent
Begnaud et al.

(10) Patent No.: US 8,225,875 B2
(45) Date of Patent: Jul. 24, 2012

(54) METHOD AND APPARATUS TO POSITION AND PROTECT CONTROL LINES BEING COUPLED TO A PIPE STRING ON A RIG

(75) Inventors: Brian David Begnaud, Youngsville, LA (US); Russell John Ferguson, Newmacher (GB); Dougal Hugo Brown, Inverness (GB)

(73) Assignee: Frank's Casing Crew and Rental Tools, Inc., Lafayette, LA (US)

( * ) Notice: Subject to any disclaimer, the term of this patent is extended or adjusted under 35 U.S.C. 154(b) by 101 days.

(21) Appl. No.: 12/113,174

(22) Filed: Apr. 30, 2008

(65) Prior Publication Data

US 2008/0264650 A1    Oct. 30, 2008

Related U.S. Application Data

(60) Provisional application No. 60/926,883, filed on Apr. 30, 2007.

(51) Int. Cl.
    *E21B 19/08* (2006.01)
(52) U.S. Cl. ............................ 166/378; 166/77.1; 248/55
(58) Field of Classification Search .................. 166/378, 166/379, 380, 385, 77.1, 77.51, 242.2; 174/97; 248/55; 193/35 C, 35 F; 242/615
    See application file for complete search history.

(56) References Cited

U.S. PATENT DOCUMENTS

| | | | | |
|---|---|---|---|---|
| 1,647,448 A | * | 11/1927 | Jones | ............................ 405/135 |
| 2,629,768 A | * | 2/1953 | Beil | ........................ 254/134.3 R |
| 3,602,467 A | * | 8/1971 | Thomas | ........................... 248/55 |
| 3,637,175 A | * | 1/1972 | McElroy | .......................... 248/55 |
| 3,770,233 A | * | 11/1973 | McElroy | .......................... 248/55 |
| 5,095,822 A | | 3/1992 | Martin | |
| 5,267,367 A | * | 12/1993 | Wegmann, Jr. | ................. 14/69.5 |
| 5,399,812 A | * | 3/1995 | Woszczyna et al. | ............ 174/97 |
| 5,777,266 A | * | 7/1998 | Herman et al. | .............. 174/68.1 |

(Continued)

FOREIGN PATENT DOCUMENTS

EP    1764291 A2    3/2007

(Continued)

OTHER PUBLICATIONS

International Preliminary Report on Patentability, mailed Nov. 12, 2009 (15 pages).

(Continued)

*Primary Examiner* — Jennifer H Gay
*Assistant Examiner* — Blake Michener
(74) *Attorney, Agent, or Firm* — Osha Liang LLP

(57) ABSTRACT

A control line positioning apparatus (10) comprising a retainer arm (30), having a control line retainer thereon, is driven between a removed position with the retainer arm (30) positioned adjacent to a base and adjacent to a rig floor and a raised position with the retainer arm (30) raised by a drive member to a raised position to hold one or more control lines (90) along a portion of the length of a pipe string (80) to facilitate application of a clamp to secure the control lines to the pipe string (80). In one embodiment, the retainer arm (30) may be releasably secured to a docking assembly (50) disposed adjacent to the pipe engaging apparatus and adjacent to a rig floor. In one embodiment, the control line positioning apparatus may comprise an ascending control line pathway (112) comprising a plurality of rolling members to direct one or more control lines to a retainer assembly.

44 Claims, 16 Drawing Sheets

U.S. PATENT DOCUMENTS

| | | | |
|---|---|---|---|
| 6,002,089 A * | 12/1999 | Hemingway et al. | 174/97 |
| 6,131,664 A * | 10/2000 | Sonnier | 166/381 |
| 6,448,497 B1 * | 9/2002 | McCracken et al. | 174/97 |
| 6,481,036 B1 | 11/2002 | Duvall | |
| 6,591,471 B1 | 7/2003 | Hollingsworth et al. | |
| 6,651,737 B2 | 11/2003 | Bouligny et al. | |
| 6,708,918 B2 * | 3/2004 | Ferris et al. | 242/615 |
| 6,742,596 B2 | 6/2004 | Haugen | |
| 6,889,772 B2 | 5/2005 | Buytaert | |
| 6,920,931 B1 | 7/2005 | Webre et al. | |
| 6,972,367 B2 * | 12/2005 | Federspiel et al. | 174/481 |
| 7,043,814 B2 | 5/2006 | Hollingsworth et al. | |
| 7,073,598 B2 | 7/2006 | Haugen | |
| 7,145,079 B1 * | 12/2006 | Henry | 174/101 |
| 7,201,233 B2 | 4/2007 | Penisson | |
| 7,216,716 B2 | 5/2007 | Webre et al. | |
| 7,222,677 B2 | 5/2007 | Webre et al. | |
| 7,249,637 B2 | 7/2007 | Hayes et al. | |
| 7,303,022 B2 * | 12/2007 | Tilton et al. | 166/380 |
| 7,314,090 B2 * | 1/2008 | Thomas et al. | 166/380 |
| 7,337,853 B2 | 3/2008 | Buytaert et al. | |
| 7,367,403 B2 | 5/2008 | Webre et al. | |
| 7,531,746 B2 * | 5/2009 | Henry | 174/68.1 |
| 7,802,666 B2 * | 9/2010 | Maino | 191/12 R |
| 2002/0036095 A1 * | 3/2002 | Ewer et al. | 174/97 |
| 2004/0079842 A1 * | 4/2004 | Hansen | 248/74.3 |
| 2004/0262013 A1 * | 12/2004 | Tilton et al. | 166/380 |
| 2005/0161230 A1 * | 7/2005 | Webre et al. | 166/384 |
| 2006/0065407 A1 * | 3/2006 | Rufey | 166/384 |
| 2006/0090901 A1 | 5/2006 | Pennison | |
| 2007/0137868 A1 | 6/2007 | Vold et al. | |
| 2007/0209804 A1 | 9/2007 | Webre et al. | |
| 2008/0006400 A1 | 1/2008 | Coyle | |
| 2008/0023192 A1 | 1/2008 | Hayes et al. | |
| 2008/0308281 A1 * | 12/2008 | Boutwell et al. | 166/385 |
| 2010/0059231 A1 | 3/2010 | Thomas et al. | |

FOREIGN PATENT DOCUMENTS

| | | |
|---|---|---|
| WO | WO2005071215 A | 8/2005 |
| WO | WO2006058056 A | 6/2006 |

OTHER PUBLICATIONS

Office Action in European Patent Application No. 08747265.0-2315, dated Mar. 9, 2010 (3 pages).

PCT/US2008/062122, PCT Invitation to Pay Additional Fees dated Feb. 9, 2008, 7 pages.

PCT/US2008/062122, PCT International Search Report and Written Opionion dated Apr. 12, 2008, 23 pages.

* cited by examiner

METHOD AND APPARATUS TO POSITION AND PROTECT CONTROL LINES BEING COUPLED TO A PIPE STRING ON A RIG

STATEMENT OF RELATED APPLICATION

This non-provisional application depends from and claims priority to U.S. provisional Ser. No. 60/926,883 filed on Apr. 30, 2007.

BACKGROUND

1. Field of the Invention

The invention relates to a method and apparatus to install pipe string and control lines secured to the pipe string in a drilled borehole. More specifically, the invention relates to a method and apparatus to position control lines to facilitate securing control lines to a string of pipe as the pipe string is being made-up and run into a borehole.

2. Background of the Related Art

A pipe string is generally installed in a drilled borehole by lowering a distal end of a pipe segment or a pipe string into the borehole, supporting the pipe segment or the pipe string from its proximal end using a pipe engaging apparatus, threadably coupling a pipe segment to the proximal end of the pipe string above the rig floor, and again lowering the lengthened pipe string into the borehole. This process is repeated until the pipe string achieves the desired length, after which it may be positioned within a targeted interval of the drilled borehole and cemented into the borehole.

The pipe string is generally supported within the borehole from its proximal end using a stationary spider or a collar load support (CLS) landing spear at or adjacent to the rig floor so that an additional pipe segment may be coupled to the proximal end of the pipe string to lengthen the pipe string. A vertically movable elevator assembly, such as a string elevator or casing running tool (CRT), may be movably suspended above the spider or CLS landing spear to engage and support the pipe string from its new proximal end (at the proximal end of the newly added pipe segment) to unload the spider or CLS landing spear. After the spider or CLS landing spear is disengaged from the pipe string, the pipe string may be lowered into the borehole by lowering the elevator assembly, and the spider or CLS landing spear may be reengaged just under the new proximal end of the pipe string.

The spider or CLS landing spear is supported by a rig in a manner that distributes the load of the pipe string to structural components in or under the rig floor. Alternately, when the load of the pipe string is supported by the elevator assembly, the load of the pipe string is distributed to structural components of the rig through a block, a draw works and a derrick to unload the spider or CLS landing spear so that it can be disengaged and opened to permit enlarged portions of the pipe string, such as pipe joints, to pass through the spider or CLS landing spear into the borehole. Specifically, to transfer the load of the pipe string from the elevator assembly back to the spider, the slips of the spider must engage and grip the exterior surface of the pipe string so that the pipe string can be supported by the spider and then released by the elevator assembly. Similarly, to transfer the load of the pipe string from the elevator assembly to a CLS landing spear, the halves of the CLS landing spear must close on and surround the exterior surface of the pipe string just below a pipe joint so that the pipe string can be supported by the CLS landing spear and then released by the elevator assembly.

Oil and/or gas wells may be equipped with control lines for electrically, fluidically or optically linking various downhole devices to the surface. For example, control lines may be used to receive data from downhole instruments and to selectively operate, from the surface, downhole devices such as valves, switches, sensors, relays or other devices. One use of control lines may be to open, close or adjust downhole valves in order to selectively produce or isolate formations penetrated by the borehole. A control line may also transmit data gathered downhole to the surface, and control lines may transmit commands from the surface to downhole devices.

Control lines may comprise conductive wires or cables for electrically controlling downhole devices, fibers for optically controlling downhole devices, or small-diameter tubing for fluidically (e.g., hydraulically or pneumatically) controlling downhole devices. Control lines are generally of a small diameter compared to the diameter of the pipe string to which they may be secured, and are generally between 0.5 and 6 cm. in diameter. Control lines may be generally aligned along the length of a portion of the outer surface of a pipe string, generally parallel to the center axis of the bore of the pipe string, and secured to the pipe string using clamps, ties, straps, etc. Although pipe strings generally comprise a plurality of pipe segments coupled together at pipe joints, a control line is generally continuous or has few joints along its length in order to eliminate or minimize couplings along the control line. Control lines may be stored on a reel that may be brought to the rig and unreeled as the control line is secured to the pipe string and installed in the borehole.

A pipe string is generally made-up and run into the borehole using a spider supported in or on a rig floor. The spider may comprise a tapered bowl that movably receives pipe slips that converge to engage and grip the pipe string, and retract to release the pipe string. Alternately, a collar load support (CLS) landing spear may comprise a pair of halves that can be closed around the pipe string to support a load transfer sleeve that engages an upper collar of the pipe string, as disclosed in U.S. Pat. No. 6,651,737, a patent that is assigned to and owned by the owner of the patent rights related to this disclosure. An elevator assembly, such as a string elevator or a casing running tool (CRT), is generally vertically movable above the spider or the CLS landing spear, and may be used to engage and movably support the pipe string so that the pipe string can be released at the spider or CLS landing spear, and so that the lengthened pipe string can be lowered further into the borehole. Whether a spider or a CLS landing spear is used to support the pipe string, during this critical "hand-off" step, the one or more control lines must be positioned and protected so that they will not become damaged. A control line secured to a pipe string is subject to being damaged and rendered useless if it is pinched or crushed between the tapered bowl and the slips of a spider, two adjacent slips of a spider, the halves of a CLS landing spear, or the pipe string and another structure. For example, but not by way of limitation, a control line may be damaged if it is pinched between the pipe string and the pipe slips that may be movably received within the tapered bowl of a spider to engage and grip the pipe string. Similarly, a control line may be damaged if it is crushed between the pipe string and the wall of the borehole as the pipe string is lowered into the borehole. If a control line is pinched or crushed, it may be necessary to remove the entire pipe string from the borehole in order to remove and replace the damaged control line, thereby resulting in a substantial loss of valuable rig time.

The control line may be secured to the pipe string using a clamp, tie, strap, band or other device. For example, but not by way of limitation, a protective clamp may be applied to secure the control line to the pipe string and also to protect the control line at critical positions along the pipe string, such as at pipe joints. Some control line clamps comprise an elongate guard member, shaped to cover and shield a portion of the control line adjacent to a pipe joint, and end portions that may couple to the guard member to secure the guard member to the pipe string and to secure the control line to the pipe string.

When running one or more control lines into a borehole along with the pipe string, it is important that the pipe slips of the spider engage and grip the pipe string in a manner that prevents crushing or damaging the control line while making up the pipe string. It is advantageous if the control lines can be positioned out of the zone of operation of the spider, or the CLS landing spear, when the spider is engaged to grip, or the CLS landing spear is closed to support, the pipe string. A control line positioning apparatus, such as a pivotable arm, may be used to position a portion of one or more control lines to prevent exposure of the control lines to crushing or pinching by the spider or by the CLS landing spear. Optionally, a rig floor, a shock table, the tapered bowl of a spider, or some other structure to support the spider or the CLS landing spear may comprise a groove, bay or recess into which the control lines can be positioned using the control line positioning arm to protect the control lines during operation of the spider or the CLS landing spear. After the load of the pipe string is transferred to the elevator assembly to unload the spider or the CLS landing spear, the control line positioning arm may then be actuated to reposition the portion of the control lines from the groove, bay or recess to a raised position proximal the pipe string but above the disengaged spider or the opened CLS landing spear so that a portion of the length of the control lines lie along the exterior surface of the pipe string to facilitate application of a clamp.

One or more reels on which control lines are stored may be disposed on or near the rig floor, and unreeled to supply control lines to the control line positioning apparatus that is one the rig floor proximate the pipe string. In order to prevent a hazard to personnel and equipment on the rig floor, the control lines may be directed overhead to one or more guide members, such as a sheave or roller, supported above the rig floor. For example, control lines may be fed from a reel, and about one or more guide members supported from the derrick and redirected toward the control line positioning apparatus on the rig floor. Alternately, the control lines may be routed through a radially more direct path to the control line positioning apparatus and to the pipe string along a path that is substantially radial to the axis of the pipe string and spaced-apart from the rig floor, but this arrangement is more likely to interfere with rig floor activities and equipment.

What is needed is a method of safely securing control lines to a pipe string as the pipe string is being made up and run into a well. What is needed is a method and an apparatus that shelters control lines and prevents damage to control lines being secured to a pipe string and installed in a borehole with the pipe string. What is needed is a method and apparatus to reliably position control lines and to provide a reliable control line feed to a control line positioning device, and to prevent the control lines from entering the operating zone of a spider or a CLS landing spear unless the spider or CLS spider is disabled from closing around a pipe string. What is needed is a method and an apparatus to deliver a control line feed to a control line positioning device that routes the control lines along a path that will not interfere with personnel or equipment on the rig floor.

SUMMARY OF THE PRESENT INVENTION

The invention satisfies one or more of the above needs by providing a control line positioning method and an apparatus to use on a rig to position and protect one or more control lines, and to facilitate clamping of control lines to a pipe string using, for example, clamps, ties, straps, bands, etc. (hereinafter these are collectively referred to herein as "clamps"). Clamps may be installed at spaced intervals along the length of a pipe string as the pipe string is made-up and run into a borehole. In one embodiment, the invention provides a control line positioning method and apparatus to protect control lines by positioning and restraining control lines from entering the operating zone of a spider or a CLS landing spear, and to prevent control lines from being pinched, crushed or otherwise damaged by such operation, which includes the movement of components of a spider or the closure of the halves of a CLS landing spear.

In another embodiment, the invention provides a control line positioning method and an apparatus to position control lines to be clamped to a pipe string while the pipe string is received through a pipe engagement apparatus and supported by an elevator assembly above the pipe engagement apparatus. The apparatus may comprise a control line retainer arm that is movable between a removed position, with the control lines restrained from entering the operating zone of the pipe engagement apparatus, and a raised position to position the control lines along the pipe string above the pipe engagement apparatus. In one embodiment, the control line retainer arm may comprise a receiving member to be removably received within a receiving assembly adjacent to the pipe engaging apparatus when the control line retainer arm is moved to a removed position to restrain the control lines from entering the operating zone of the pipe engaging apparatus. In another embodiment, the control line retainer arm may comprise a docking member to be releasably coupled to a docking assembly adjacent to the pipe engaging apparatus when the control line retainer assembly is moved to its removed position to restrain the control lines from entering the operating zone of the pipe engaging apparatus, and the control line retainer arm may be released from the docking assembly and moved, using a drive member, to position the control lines along a portion of the pipe string, and generally along a side of the portion of the pipe string that is radially disposed toward the control line retainer arm. The control lines may be held in that position as they are clamped to the pipe string.

Some embodiments of the control line positioning apparatus may be used with a safety interlock system to prevent damage to control lines. For example, but not by way of limitation, a docking assembly may be positioned adjacent to the pipe engagement apparatus and used to releasably couple to the control line retainer arm and to secure the retainer arm in its removed position during engagement of the pipe engaging apparatus with the pipe string. In one embodiment, the docking assembly may be mechanically, fluidically or electrically coupled to the pipe engaging apparatus to provide a safety interlock system preventing release of the control line retainer arm from the docking assembly until the pipe engaging apparatus is in a disengaged or open condition. In one embodiment, when the pipe engaging apparatus is in the disengaged or open condition and the control line retainer arm is released from the docking assembly, the docking assembly may deploy, or cause to be deployed, one or more blocking members to prevent re-engagement of the pipe engagement apparatus until the control line retainer arm is again releasably coupled to the docking assembly. In one embodiment, when the control line retainer arm couples to the docking assembly, the docking assembly may automatically disable or retract the one or more blocking members to again permit the pipe engagement apparatus to engage and support the pipe string.

In one embodiment, the movement of the control line retainer arm of the control line positioning apparatus may be by rotation and/or translation, and the control line retainer arm may be movable between the removed position, to restrain the control lines from entering the operating zone of the pipe engagement apparatus, and a raised position to position the control lines along a portion of the pipe string to facilitate the application of a clamp. In one embodiment, the movement of the control line retainer arm may, for example, be generated by simultaneous translation and rotation of the control line retainer arm within a common plane as the control retainer arm is raised from the removed position to the raised position, or as the retainer arm is lowered from the raised position to the removed position. The translation and/or rotation of the retainer arm may be driven by a drive member, for example, a cylinder, coupled to the control line retainer arm.

In one embodiment, the control line positioning apparatus may comprise a positionable control line retainer arm supporting a control line retainer assembly. The control line retainer assembly may comprise a control line retainer that may slidably or rollably engage one or more control lines so that the control lines can be positioned proximal to the pipe string by raising the control line retainer arm from the removed position to the raised position. The one or more control lines may be fed to the control line retainer assembly coupled to the control line retainer arm from a control line reel that is positioned remote to the control line positioning apparatus. In one embodiment, a control line reel may be disposed above, on or adjacent to the rig floor and generally lateral to the pipe string. In another embodiment, a control line reel may be disposed underneath the rig floor within a sub-space. Optionally, the control line retainer comprises rolling members, such as rollers or sheaves, and the control lines may be routed or threaded over the rollers or sheaves to rotatably couple the control lines to the control line retainer arm, and to feed the control lines to the control line retainer that is positionable by movement of the control line retainer arm.

Once positioned along the pipe string by the control line positioning apparatus, the control lines may be secured to the pipe string using fasteners, such as clamps, sleeves, bands, clips, ties or other fasteners, and these fasteners may be applied or installed by rig personnel or by an automatic fastener installing machine. In one embodiment, a fastener installing machine may be coupled to and supported by the control line positioning apparatus and automatically deployed to install a fastener to clamp control lines to the pipe string when the control line retainer arm is in the raised position.

In one embodiment of the control line positioning method and the apparatus, for example, when the slips of a spider engage and grip a pipe string, or when the halves of the CLS landing spear close to surround and support the pipe string, the control line retainer arm of the control line positioning apparatus is in the removed position to position and restrain the control lines from entering the operating zone of the pipe slips of the spider, or from entering the operating zone of the halves of the CLS landing spear, to protect the control lines from being pinched, crushed or otherwise damaged. In one embodiment, the control line positioning apparatus may be automatically disabled. For example, the control line positioning apparatus may be disabled during engagement of the pipe engaging apparatus by releasably coupling the control line retainer arm to a docking assembly adjacent to the pipe engaging apparatus to prevent inadvertent movement of the control line retainer arm to the raised position and to prevent the resulting movement of the control lines from entering the operating zone of the pipe engaging apparatus. In an alternate embodiment, the pipe engaging apparatus may be disabled from engaging the pipe string when the control line retainer arm is not in the removed position. For example, the slips of a spider may be disabled from engaging the pipe string, or the halves of the CLS landing spear may be disabled from closing to surround the pipe string, when the control line retainer arm of the control line positioning apparatus is not in the removed position. These safeguards prevent damage to control lines by engagement of the slips of the spider or by closure of the halves of the CLS landing spear.

In one embodiment of the control line positioning apparatus for use with a spider, the retainer arm of the control line positioning apparatus positions the control lines along a portion of the pipe string and at a radial position that is generally opposite the center slip of a three-unit slip assembly. In a three-unit slip assembly, a center slip, a right slip and a left slip each comprise a gripping face having a generally arcuate gripping surface that generally conforms to the curvature of the exterior of the pipe string. The right slip and the left slip may be hingedly coupled to the right side and the left side, respectively, of the center slip so as to form a generally annular slip assembly when the right and left slips are rotated to surround the pipe string. When the spider is disengaged, the load of the pipe string is transferred to the elevator assembly, and the center slip is manipulated up from its gripping position within the tapered bowl of the spider, and simultaneously pulled radially away from the pipe string. As the right slip and left slip follow the center slip, each of the right slip and the left slip hinge and rotate away from the annular position relative to the center slip, and toward a lateral, open and disengaged position relative to the center slip. It should be understood that the number of slips in the slip assembly may be varied without a substantial change in the manner of use or mode of operation of the slip assembly within the context of the use and operation of the control line positioning apparatus.

In one embodiment, the movement of the control line retainer arm of the control line positioning apparatus between the removed position and the raised position is provided by operation of a mechanical linkage comprising the control line retainer arm having a first end and a second end, a track that engages a follower that is coupled to the retainer arm intermediate the first end and the second end, a stabilizer coupled to the control line retainer arm and a drive member to drive the follower along the path of the track. The path of the track may be generally adapted to produce, at the control line retainer assembly that is coupled to the second end of the control line retainer arm, a resulting path terminating at a removed position proximate the pipe engaging apparatus at or near a lower end of the track, and terminating at a raised position that is proximate the pipe string and generally above the pipe engaging apparatus at or near an upper end of the track.

In another aspect, the invention comprises a rig floor-mounted pathway comprising a protectable control line feed channel. In one embodiment, the rig floor-mounted pathway comprises a channel cover, a first cover support and a generally parallel second cover support. The cover and the first and second cover supports may each be generally elongate, each having a first end disposed proximate a control line positioning apparatus and a second end distal the control line positioning apparatus. In one embodiment, the channel cover may be hingedly coupled to one of the first cover support or the second cover support, and the channel cover may be pivotable between an open position to provide access to the control line feed channel, and a closed position to close and protect the control line feed channel.

In one embodiment, the first and/or the second cover supports each may comprise a generally triangular cross-section and positioned one relative to the other to dispose an acutely angled portion of the cover support outboard to the channel, and to disposed a substantially right-angled or a substantially angled portion of the cover support adjacent to the channel defined between the first and the second cover supports. This arrangement of the cover supports and the triangular cross-sections thereof provides a ramp-like structure on both sides of the rig floor-mounted pathway, each generally parallel to the channel, to facilitate unimpaired movement of equipment or personnel over the pathway. The cover supports may comprise highly visible colors and/or treaded surfaces to provide favorable traction for personnel that may walk on the pathway.

In one embodiment, the rig floor-mounted pathway may comprise a bend portion to receive a control line feed and redirect one or more control lines received at an inlet to the bend portion to assume a new direction upon exiting the bend portion through an outlet. The bend portion may comprise a plurality of rolling members, such as rollers, arranged in one or more arcuate patterns to prevent exceeding a desired minimum bend radius as the control lines are redirected by the bend portion. In one embodiment, the bend portion may be coupled to a scale, a strain gauge, a load cell or other force measuring device to measure the force applied to the bend portion, or to a component of the bend portion, and the measured force may be used to determine the tension in one or more of the control lines redirected by the bend portion. In one embodiment, the force may be measured and the tension in one or more control lines may be determined using an algorithm that calculates the tension, and the tension in the one or more control lines may be compared to one or more maximum recommended tension values to generate a warning, alarm, or to interrupt operation of the control line positioning apparatus fed by the pathway until the cause of the excessive control line tension can be investigated and remedied.

In another embodiment, a control line positioning apparatus may provide a base, a control line retainer arm having a first end and a second end, a drive member to move the control line retainer arm between a removed position and a raised position, and an ascending control line pathway cooperating with the control line retainer arm and having an inlet to the ascending pathway proximate the base and an outlet spaced-apart from the inlet and generally above or proximate to the retainer arm. The ascending pathway may further comprise one or more rolling members to engage and redirect one or more control lines fed into the inlet, for example, from a rig floor-mounted pathway or from an aperture through the rig floor providing access to a sub-space beneath the rig floor. The rolling members of the ascending pathway are spaced apart one from the others to redirect the one or more control lines along the rolling members without exceeding the minimum bend radius of the one or more control lines, and the rolling members are positioned to feed the one or more control lines from the outlet of the ascending pathway and to the control line retainer assembly coupled to the second end of the control line retainer arm when in the control line retainer arm is in the removed position, the raised position, and all positions therebetween.

The foregoing, as well as other, objects, features, and advantages of the present invention will be more fully appreciated and understood by reference to the following drawings, specification and claims.

BRIEF DESCRIPTION OF THE DRAWINGS

FIG. 6B shows the docking wheel coupled to the docking member and blocked from rotation back to its open position to immobilize the control line retainer arm.

DETAILED DESCRIPTION OF THE PRESENT INVENTION

Figure 1:
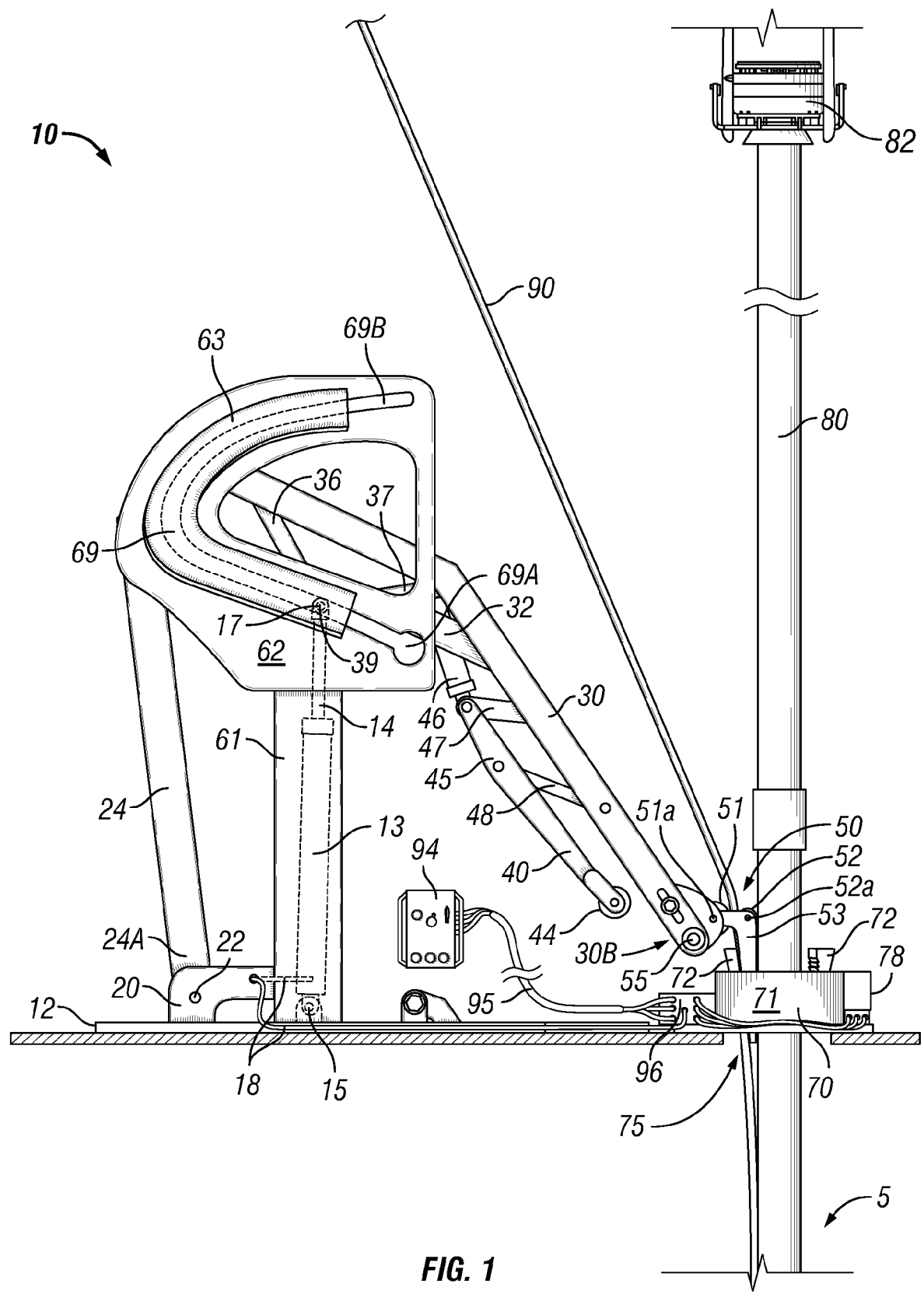
FIG. 1 is an elevation view of one embodiment of the control line positioning apparatus having a control line retainer assembly coupled to the second end of a rotational and translational control line retainer arm, the control line retainer assembly positioned adjacent to, and slightly elevated from, a spider.

In one embodiment, the invention provides a control line positioning method and apparatus to position one or more generally continuous control lines along a portion of a pipe string to facilitate securing the control lines to the pipe string as it is made-up and run into a borehole from a rig. The method may comprise the steps of coupling one or more control lines to a control line retainer arm that is movable by a drive member between a raised position and a removed position that restrains the control lines from entering the operating zone of a pipe engaging apparatus. The method may additionally comprise the step of releasably coupling the control line retainer arm in the removed position to prevent the retainer arm from being moved to the raised position until the pipe engaging apparatus is in the open and disengaged condition. The method may further comprise the steps of releasing the control line retainer arm from the coupled position, raising the control line retainer arm to position the control lines along a portion of the pipe string above the pipe engagement apparatus, and clamping the control lines to the pipe string. The method may further comprise the steps of lowering the pipe string and the control lines into the borehole, returning the control line retainer arm to the removed position, and closing the pipe engaging apparatus to engage and support the pipe string in the borehole.

In another embodiment, the invention provides a control line positioning method and apparatus to position one or more control lines along a portion of a pipe string above a pipe engaging apparatus to be clamped to the pipe string as the pipe string is made-up and run into a borehole, and to protect the control lines from being pinched or crushed by closure of the pipe engaging apparatus used to engage and support the pipe string within the borehole. The apparatus may comprise a base, a control line retainer arm movable between a raised position and a removed position to restrain the control lines from entering the operating zone of the pipe engaging apparatus, and a control line retainer assembly having a control line retainer coupled to and movable by the control line retainer arm. In one embodiment, the apparatus may further comprise a docking member to releasably couple to a docking assembly disposed adjacent to the pipe engaging apparatus. In another embodiment, the apparatus may further comprise a receiving member to be removably received in a receiving assembly disposed adjacent to the pipe engaging apparatus. The drive member of the apparatus may be used to drive the control line retainer arm to the raised position to position control lines along a portion of the pipe string above the pipe engaging apparatus to be clamped to the pipe string. After a clamp is applied to secure the control lines to the pipe string, the pipe string and the control lines may be lowered into the borehole to position the clamp below the pipe engaging apparatus, the control line retainer arm may be moved to the removed position, and the load of the pipe string may then be transferred back from the elevator assembly to the pipe engaging apparatus. The method and the apparatus will protect the control lines from damage that may result from pinching or crushing between pipe slips of a spider, or between a pipe slip and the exterior surface of the pipe string, or between the halves of a CLS landing spear in a CLS pipe engaging apparatus.

In one embodiment, a control line positioning apparatus comprises a control line retainer arm, positionable between a raised position and a removed position, and movably supporting a control line retainer assembly thereon. The control line retainer assembly may comprise a control line retainer that slidably or rollably engages one or more control lines fed to the pipe string through or over the control line retainer assembly. In one embodiment, the control line retainer assembly may further comprise a docking member that can be releasably coupled in a docking assembly disposed adjacent to the pipe engaging apparatus when the control line retainer apparatus is in the removed position.

In one embodiment, the control line positioning apparatus may be automatically disabled from moving the control line retainer arm to the raised position, and from thereby positioning the control lines along a potion of the pipe string above the pipe engaging apparatus, when the pipe engaging apparatus is engaged and supporting the pipe string within the borehole, thereby requiring that the pipe string be supported from an elevator assembly movably disposed above the rig floor and above the pipe engaging apparatus. For example, the control line positioning apparatus may be disabled when the slips of a spider are engaged to support the pipe string in the borehole. In an alternate embodiment, the pipe engaging apparatus may be disabled from engaging and supporting the pipe string when the control line positioning apparatus is not in a removed position restraining the control lines from entering the operating zone of the pipe engaging apparatus. For example, the slips of a pipe engaging apparatus supported on or in a rig floor may be disabled from engaging and supporting a pipe string in a borehole when the control line retainer arm of the control line positioning apparatus is raised to position control lines along a portion of the pipe string above the pipe engaging apparatus.

In one embodiment of the control line positioning apparatus that is adapted to cooperate with a spider, the control line retainer arm may be movable to position one or more control lines along a portion of the pipe string above the pipe engaging apparatus and at a position generally radially opposite the center slip of a three-unit slip assembly. In a three-unit slip assembly, a center slip, a right slip and a left slip each define, along each gripping face, an arcuate gripping surface that generally conforms to the exterior contour of the pipe string. The right slip and the left slip are hingedly coupled to the right side and the left side, respectively, of the center slip so as to form a generally annular slip assembly when the right and left slips are rotated to the gripping positions relative to the center slip. When the spider is to be disengaged, the load of the pipe string may be transferred to an elevator assembly movably disposed above the spider, and the center slip may be manipulated up from its gripping position within the tapered bowl of the spider and radially away from the pipe string. As the right and left slips follow, each hinges away from its annular position relative to the center slip and toward a open and disengaged position. It should be understood that the number of slips in the slip assembly may be varied without substantial change in the manner of use or operation of the slip assembly within the context of the use and operation of the control line positioning apparatus.

In one embodiment, the positioning of the control line retainer arm of the control line positioning apparatus between the removed position and the raised position is provided by rotation of the control line retainer arm. In another embodiment, the positioning of the control line retainer arm of the control line positioning apparatus between the raised position and the removed position is provided by translation of the control line retainer arm, either vertical, horizontal or both. A control line retainer assembly may be coupled to the control line retainer arm to slidably or rollably couple one or more control lines to the control line retainer arm so that the control lines can be fed into the borehole along with the pipe string, and the control lines may also be positioned between the raised position and the removed position by rotational or translational movement of the arm. It should be understood that a rotationally movable control line retainer arm and/or a translatably movable control line retainer arm may also extend, for example, by use of an extendable cylinder or a telescoping cylinder, to vary its length in order to position the control line retainer arm in the removed position to restrain the control lines slidably or rollably coupled thereto from entering the operating zone of a pipe engaging apparatus.

In one embodiment, the positioning of the control line retainer arm of the control line positioning apparatus between the removed position and the raised position is provided by simultaneous rotation and translation of the control line retainer arm. In this embodiment, the control line positioning apparatus may comprise a base, a track supported on the base to engage a follower driven by a drive member along a path of the track, a stabilizer coupled to the base at a first end and coupled to a retainer arm at a second end, the control line retainer arm coupled to the follower and positionable by the drive member, as restrained by the track and follower, and the stabilizer, between a removed position and a raised position. The follower may be moved along the path of the track by, for example, a cylinder or other source of mechanical, hydraulic or pneumatic power.

In one embodiment, a control line retainer assembly may be coupled to the control line retainer arm and may comprise a control line retainer to slidably or rollably couple one or more control lines to the control line retainer arm so that the control lines may be positioned by movement of the control line retainer arm. In embodiments of the control line positioning apparatus that cooperate with a docking assembly or a control line retainer arm position sensor to implement a safety interlock to prevent damage to the control lines from closure of the pipe engaging apparatus, the control line retainer assembly may comprise a docking member that can be releasably captured by a docking assembly, or it may comprise a position sensor that can detect movement of the control line retainer assembly to its removed position.

FIG. 1 is an elevation view of one embodiment of the control line positioning apparatus 10 having a control line retainer assembly 50 coupled to the second end 30B of a rotatable and translatable control line retainer arm 30, the control line retainer assembly 50 positioned adjacent to a pipe string 80 and proximate a pipe engaging apparatus 70. The pipe engaging apparatus 70 shown in FIG. 1 is a spider that is supported by the rig floor 8 generally over an aperture 75 in the rig floor 8, and an elevator assembly 82 can be engaged to support the pipe string 80 so that the pipe engaging apparatus 70 may be disengaged. The control line retainer 50 of FIG. 1 may comprise a plurality of rolling member to rollably engage a control line 90 as it is moved by the control line retainer arm to position the control line 90. It should be understood that a single control line 90 is illustrated in many of the appended drawings, but a plurality of control lines can be positioned in a generally parallel relationship by the control line positioning apparatus 10.

In the embodiment of the control line retainer assembly 50 shown in FIG. 1, a primary roller 51 rotatable on a first axle 51a engages the control line 90. Optionally, a generally "L"-shaped protective shield 53 may be rotatably coupled to the first axle 51a to support a secondary roller 52 rotatable on a second axle 52a and spaced apart from the primary roller 51 to accommodate one or more control lines 90 there between. It should be understood that the primary roller 51 and, optionally, the secondary roller 52 may each comprise one or more grooves, ridges, shoulders or rims to position and retain control lines in a generally predetermined position along the roller and/or in a parallel relationship with other control lines as the control lines are fed through the control line retainer assembly 50 during movement of the control line retainer arm 30 relative to the control line 90.

Optionally, control line retainer assembly 50 may be hinged to open so that control lines can be introduced and retained within or removed from the control line retainer assembly 50. In one embodiment to be discussed later in connection with FIGS. 5-6B, 8A-8B and 10, the control line retainer 50 may further comprise a receiving member or a docking member that may be removably received or releasably coupled, respectively, to a receiving assembly or a docking assembly, respectively. While no receiving assembly or docking assembly is shown in FIGS. 1-4, it should be noted that, in one embodiment of a receiving member and/or a docking member, a protruding locking pin 55 may protrude outwardly from the control line retainer assembly 50 to serve this purpose.

The pipe engaging apparatus, which in FIG. 1 is a spider 70, comprises a tapered bowl 71 movably receiving a set of pipe slips 72 that can be engaged with the exterior surface of the pipe string 80 to support the pipe string 80 within the borehole 5 below the spider 70.

The embodiment of the control line positioning apparatus 10 shown in FIG. 1 comprises a base 12 pivotally coupled to the first end 24A of a stabilizer 24 to provide rotation of the stabilizer 24 within an angular range and within a generally vertical plane within the plane of elevation view of FIG. 1. The base 12 also supports a frame 62 having a track 69 with a lower end 69A and an upper end 69B. The path of the track 69 shown in FIG. 1 may be generally characterized as upwardly sloped at every position along the path of the track 69 between the lower end 69A and upper end 69B or, alternately, the track 69 may be characterized as downwardly sloped at every position along the path of the track 69 between the upper end 69B and lower end 69A. The track 69 shown in FIG. 1 is adapted to slidably or rollably engage a follower 39 coupled through truss members 36, 37 to the control line retainer arm 30 and imposing on the follower 39 a pattern of movement influenced or determined by the path of the track 69. The frame 62 and the track 69 in FIG. 1 are supported in a generally fixed position relative to the base 12 by a support 61 extending upwardly from the base 12.

The second end 24B (not shown in FIG. 1—see FIGS. 2-5) of the stabilizer 24 shown in FIG. 1 is pivotally coupled to a first end 30A of a control line retainer arm 30, and the retainer arm assembly 50 is coupled to the second end 30B of the retainer arm 30, with the control line retainer arm 30 coupled to the follower 39 through truss members 36, 37 at a position intermediate the first end 30A and the second end 30B. It should be understood that the retainer arm 30 of the control line positioning apparatus 10 in FIG. 1, like the stabilizer arm 24, may rotates within the plane of the drawing, but unlike the stabilizer arm 24, the retainer arm 30 shown in FIG. 1 may also translates within the same plane during operation of the control line positioning apparatus 10 as disclosed in connection with FIGS. 1-4.

Figure 4:
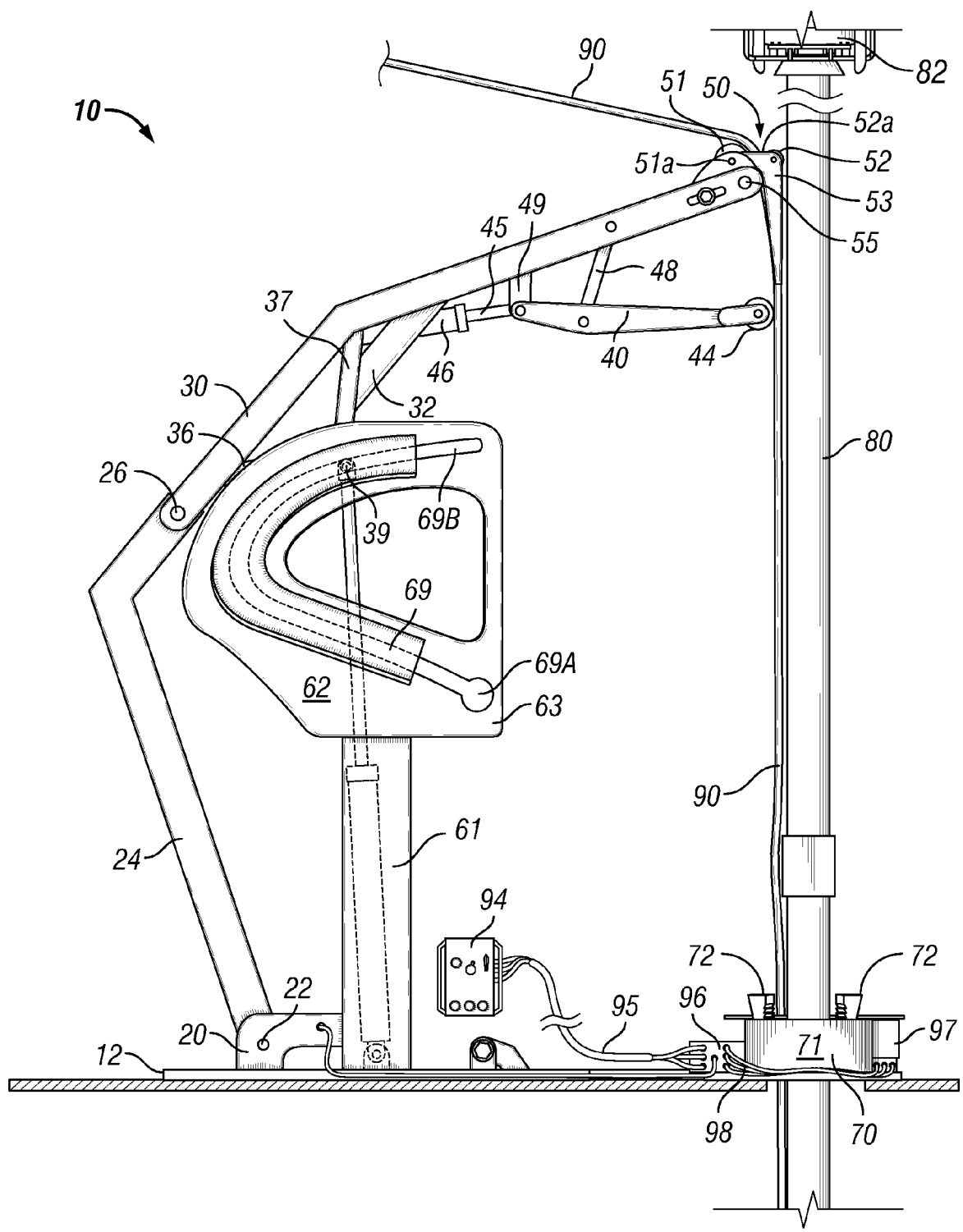
FIG. 4 is the control line positioning apparatus of FIG. 3 after the control line retainer arm and the control line retainer assembly thereon are moved, using the drive member, to a raised position proximate the pipe string and still further above the spider by further rotation and translation of the control line retainer arm, and after an optional auxiliary pusher arm movably coupled to the control line retainer arm is deployed to position the control lines along a portion of the pipe string to facilitate clamping of the control line to the portion of the pipe string above the spider.
Figure 5:
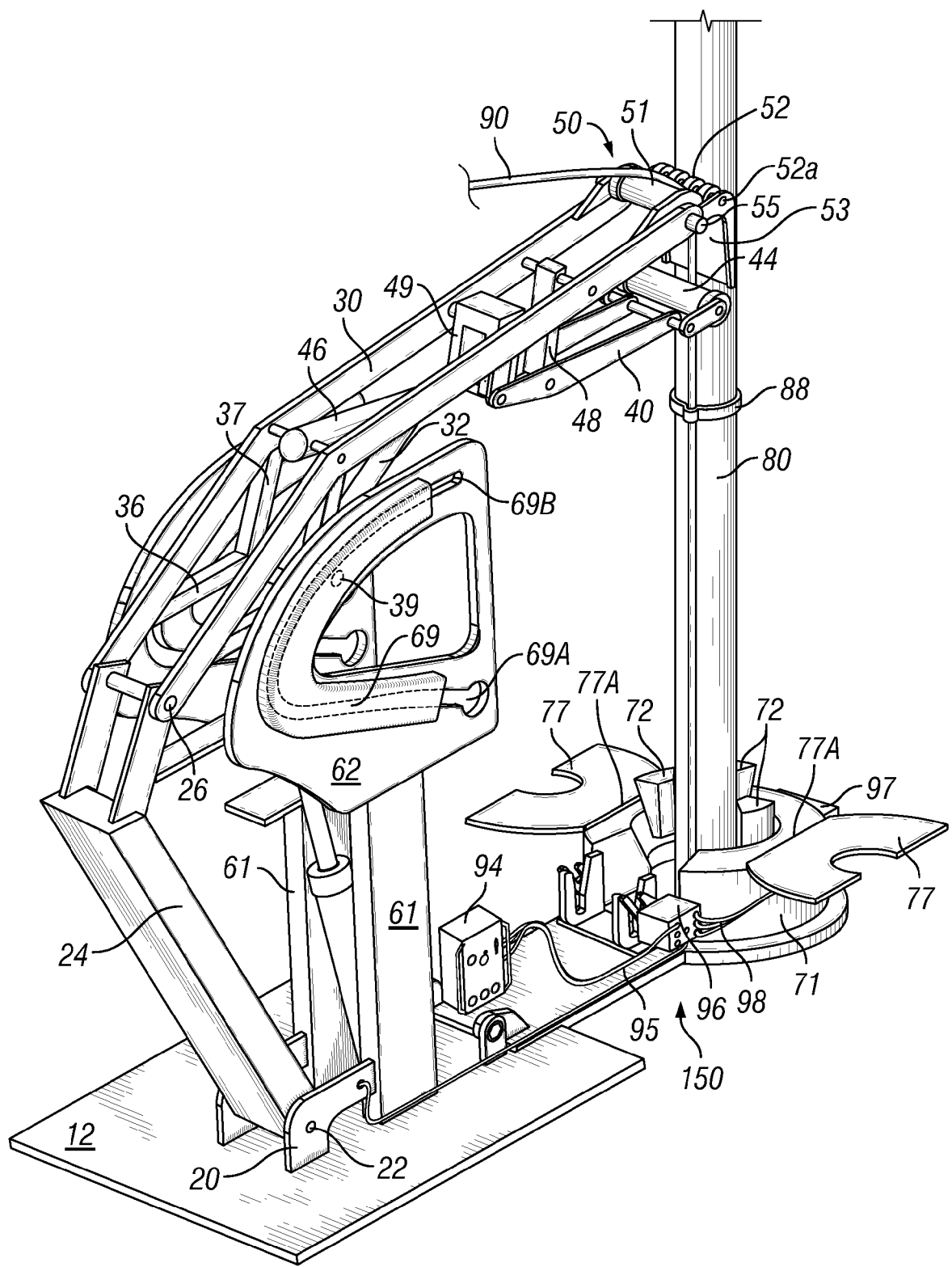
FIG. 5 is a perspective view of the control line manipulator of FIG. 4 after a clamp is installed to secure the control line to the portion of the pipe string above the spider. Also shown in FIG. 5, but not present in FIGS. 1-4, is one embodiment of a docking assembly to secure the control line retainer arm in a removed position.

Also shown in FIG. 1 is an auxiliary arm 40 that may deploy, as shown in FIGS. 4 and 5, to position the control line 90 along a portion of the pipe string 80 to facilitate clamping (not shown in FIG. 1—see FIG. 5) to secure the control line 90 to the pipe string 80. The auxiliary arm 40 in FIG. 1 is pivotally coupled to the retainer arm 30 by auxiliary pusher arm stabilizers 47, 48 and the auxiliary arm 40 may be retracted (as shown in FIG. 1) or extended (as shown in FIG. 4) by auxiliary pusher arm cylinder 46.

The control line positioning arm 10 of FIG. 1 further comprises a drive member 13 having a feed line of pressurized fluid 18 to move the control line retainer arm 30 between a removed position and a raised position, as will be discussed in relation to FIGS. 2-4. The traveling end 17 of the rod 14 is pivotally coupled to the follower 39 of the retainer arm 30 to guide the follower 39 along the path of the track 69 upon extension and retraction of rod 14 from and within cylinder 13. The cylinder 13 in FIG. 1 is pivotally coupled to base 12 at cylinder pivot 15 to permit the cylinder 13 to pivot within a limited angular range in the plane of the drawing of FIG. 1.

Figure 2:
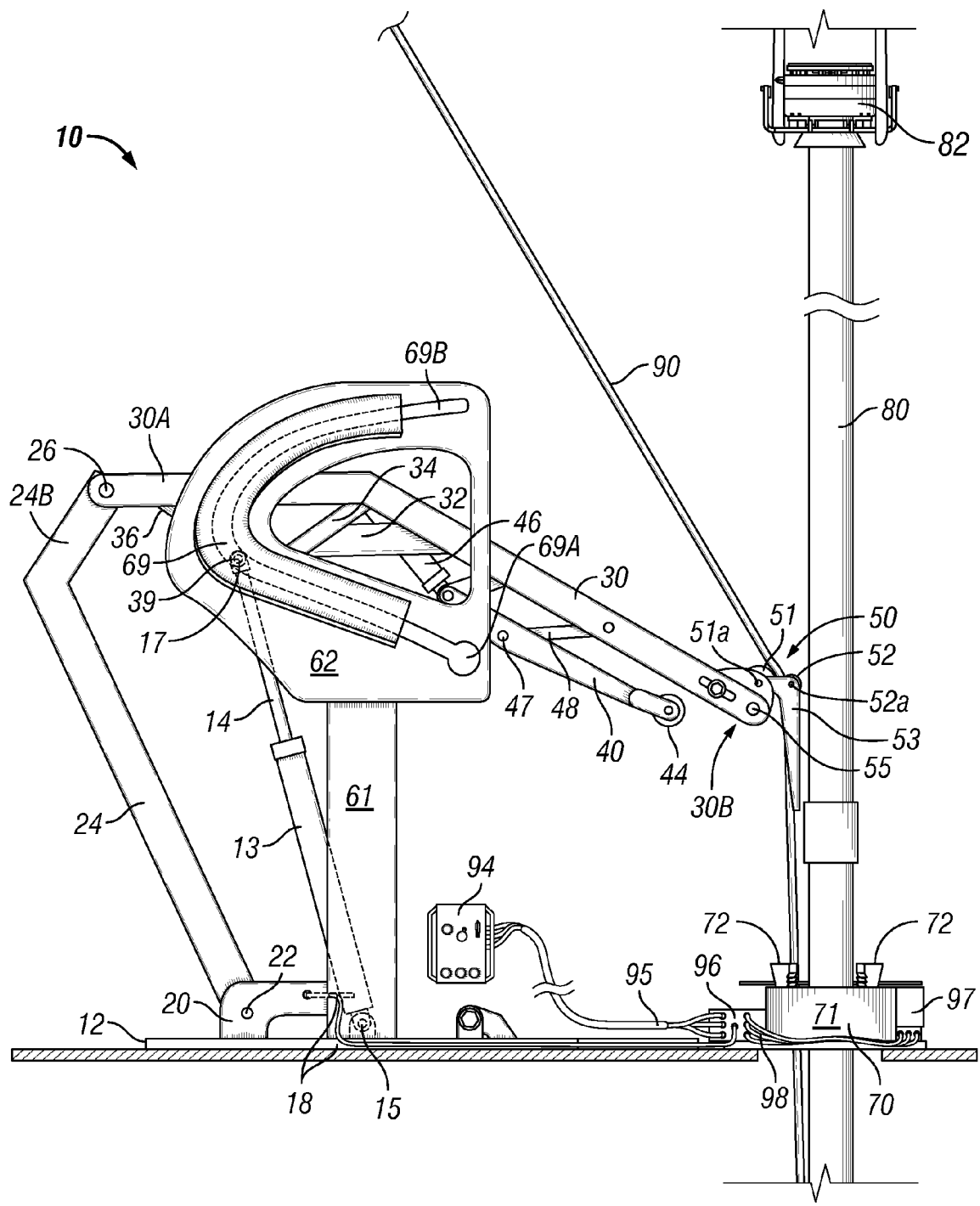
FIG. 2 is the control line positioning apparatus of FIG. 1 after the control line retainer arm and the control line retainer assembly thereon are moved, using a drive member, to a position proximate the pipe string and further above the spider by rotation and translation of the control line retainer arm.

FIG. 2 is the control line positioning apparatus 10 of FIG. 1 after the retainer arm 30 and the control line retainer assembly 50 are raised, by extension of drive member 13, to a position the retainer assembly 50 adjacent to the pipe string 80 and generally further above the pipe engaging apparatus 70 as compared to the position shown in FIG. 1. The movement of the control line retainer assembly 50 to the position shown in FIG. 2, as compared to the position in FIG. 1, results from simultaneous rotation (in a counterclockwise direction) and translation (to the left in FIG. 1) of the control line retainer arm 30. FIG. 2 shows the cylinder rod 14 extended further from the cylinder 13 due to force applied to the rod 14 by pressurized fluid supplied to the cylinder 13 through fluid conduit 18, and also pivotal rotation of the cylinder 13 about pivot 15 (in a counterclockwise direction) as the cylinder rod 14 extends to drive the traveling end 17 and the follower 39 upwardly along the path of track 69. The stabilizer 24 has also pivoted (in a counterclockwise direction) from its position in FIG. 1.

Figure 3:
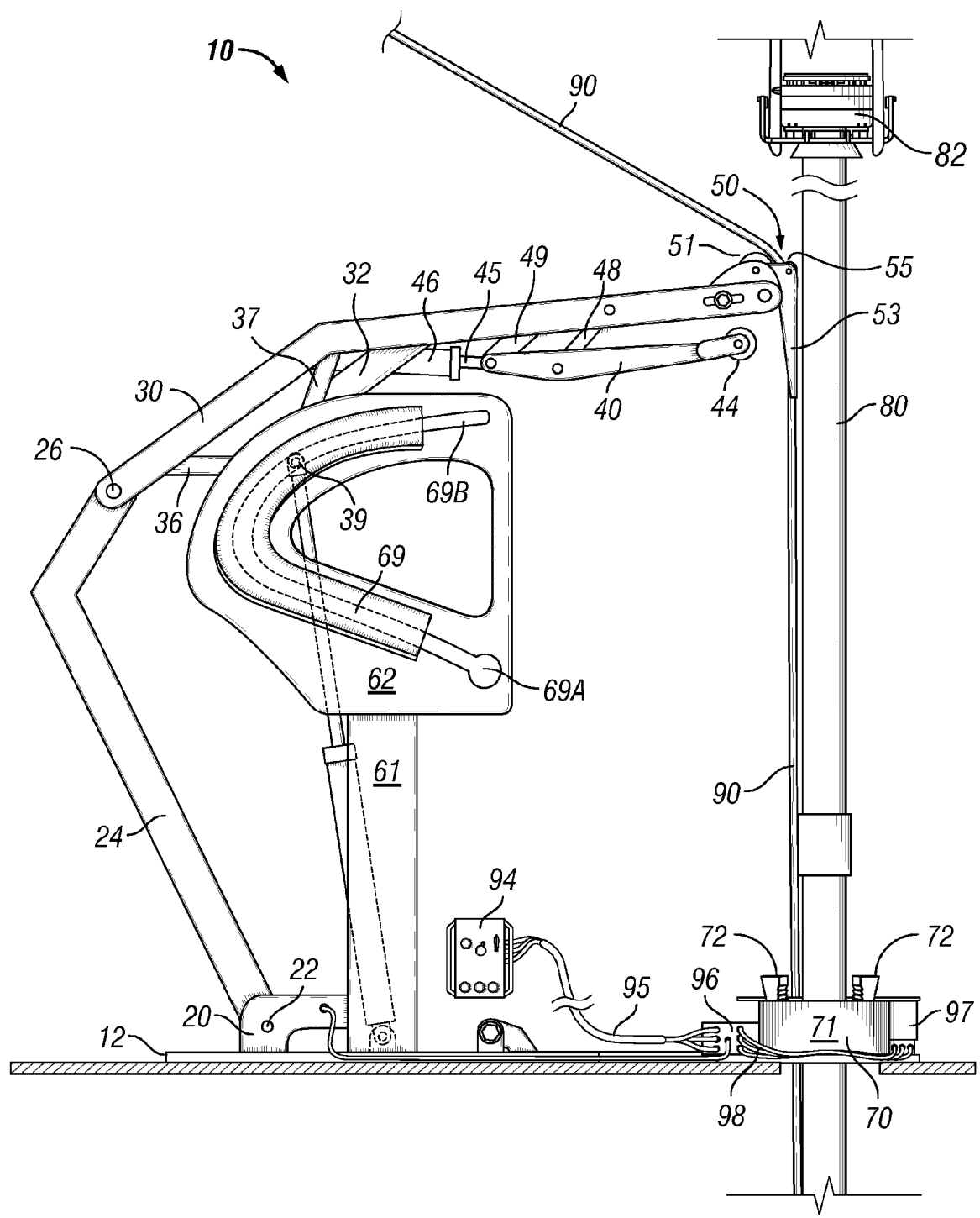
FIG. 3 is the control line positioning apparatus of FIG. 2 after the control line retainer arm and the control line retainer assembly are moved, using the drive member, to a position proximate the pipe string and still further above the spider by further rotation and translation of the retainer arm.

FIG. 3 is the elevation view of FIG. 2 after the control line retainer assembly 50 is moved further by extension of drive member 13 to a position generally adjacent the pipe string 80 and still further above the pipe engaging apparatus 70. The cylinder 13 moves the travelling end 17 and the follower 39 further along the path of the track 69 towards the upper end 69B. It should be noted that the stabilizer 24, which initially rotated counterclockwise (from the position in FIG. 1 to the position in FIG. 2) has reversed its direction of rotation due to the change in horizontal component of the direction of the track 69, and that the extreme counterclockwise position of the stabilizer 24 occurred at a point intermediate the positions shown in FIGS. 2 and 3.

FIG. 4 is the elevation view of the control line positioning apparatus 10 of FIG. 3 after the control line retainer assembly 50 is moved further by extension of drive member 13 to a raised position generally adjacent to and proximate the pipe string 80, and further above the pipe engaging apparatus 70 as compared to FIG. 3, and after an optional auxiliary pusher arm 40 is deployed by extension of auxiliary pusher arm cylinder 46 to position the control line 90 along a portion of the pipe string 80 above the pipe engaging apparatus 70 to facilitate clamping to secure the control line 90 to the pipe string 80. The follower 39 is shown to be moved, as compared to the position in FIG. 3, further along the path of the track 69 by further extension of the rod 14 from the cylinder 13. It should be understood that curvilinear path of the track 69 enables the control line positioning apparatus 10 of FIG. 4 to be used to position control lines against or proximate to a pipe string with a range of distances separating the base 12 of the apparatus 10 from the pipe engaging apparatus 70 since the follower 39 can be, if necessary to achieve proper control line positioning, positioned further along the path of the track 69 towards the upper end 69B. It should also be understood that this flexibility enables the control line positioning apparatus 10 to be used to position control lines against or proximate to a range of diameters of pipe string given a constant distance separating the base 12 from the pipe engaging apparatus 70. With the distance between the base 12 of the control line positioning apparatus 10 and the pipe engaging apparatus 70 and the diameter of the pipe string 80 shown in FIGS. 1-4, the position of the control line positioning apparatus 10 shown in FIG. 4 represents the fully-deployed configuration of the control line positioning apparatus 10 for this specific configuration, but the raised position of a given control line positioning apparatus 10 may vary according to these parameters. It should be further understood that the shapes and configurations of the various components of the control line positioning apparatus 10, such as, for example, the length and pivot location of the stabilizer 24, the angle, length and position of the follower 39 of the control line retainer arm 30, the position of the follower 39 on the retainer arm 30, the length and pivot position of the cylinder 13, and the shape and location of the track 69 within frame 62, to name a few, as well as the relative spatial relationships of these components, one relative to the others, will influence the raised position and the removed position shown in FIGS. 4 and 1, respectively, as well as all intermediate positions, such as those shown in FIGS. 2 and 3.

It should be noted that the pipe string 80 shown in FIGS. 1-4 is supported by an elevator assembly 82 coupled to the pipe string 80 and, in turn, supported from above the view of these figures by bails 83, a block and draw works (not shown in FIGS. 1-4), as is well known in the art. The pipe string 80 must remain supported from the string elevator above at all times until the slips 72 of the spider 70 are released to seat in the tapered bowl 71 and to engage and support the pipe string 80 within the borehole.

FIG. 5 is a perspective view of the embodiment of the control line positioning apparatus 10 shown in FIG. 4 after a clamp 88 is installed to secure the control line 90 to the pipe string 80. FIG. 5 reveals a generally bipartite structure of the embodiment of the control line retainer arm 30, frame support 61, frame 62, track 69 and follower 39 shown in FIG. 5, and a generally unitary and centered stabilizer 24, cylinder 13, and auxiliary pusher arm cylinder 46, all generally intermediate the bipartite members. It should be understood that a wide variety of each of these components can be designed without departing from the scope of the invention, and that the illustrations in FIGS. 1-5 are of but one embodiment of the control line positioning apparatus 10.

In one embodiment of the control line positioning apparatus 10, the control line retainer arm can be moved to its removed position and releasably coupled to a docking assembly adjacent the pipe engaging apparatus that cooperates with the pipe engaging apparatus to prevent inadvertent closure of the pipe engaging apparatus if the control line retainer assembly is not coupled to the docking assembly, to prevent inadvertent moving of the control line retainer arm away from the removed position while the pipe engaging apparatus is in the closed position, or both. It should be understood that a docking assembly that cooperates with the pipe engaging apparatus to prevent one or both of these actions may be used along with a control line positioning apparatus of the invention. Similarly, in one embodiment of the control line positioning apparatus 10, the control line retainer arm can be moved to its removed position and removably received in or at a receiving assembly adjacent the pipe engaging apparatus that cooperates with the pipe engaging apparatus to prevent inadvertent closure of the pipe engaging apparatus if the control line retainer assembly is not received in or at the receiving assembly, to prevent inadvertent moving of the control line retainer arm away from the removed position while the pipe engaging apparatus is in the closed position, or both. It should be understood that a docking assembly or a receiving assembly that cooperates with the pipe engaging apparatus to prevent one or both of these actions may be used along with a control line positioning apparatus of the invention.

Figure 6A:
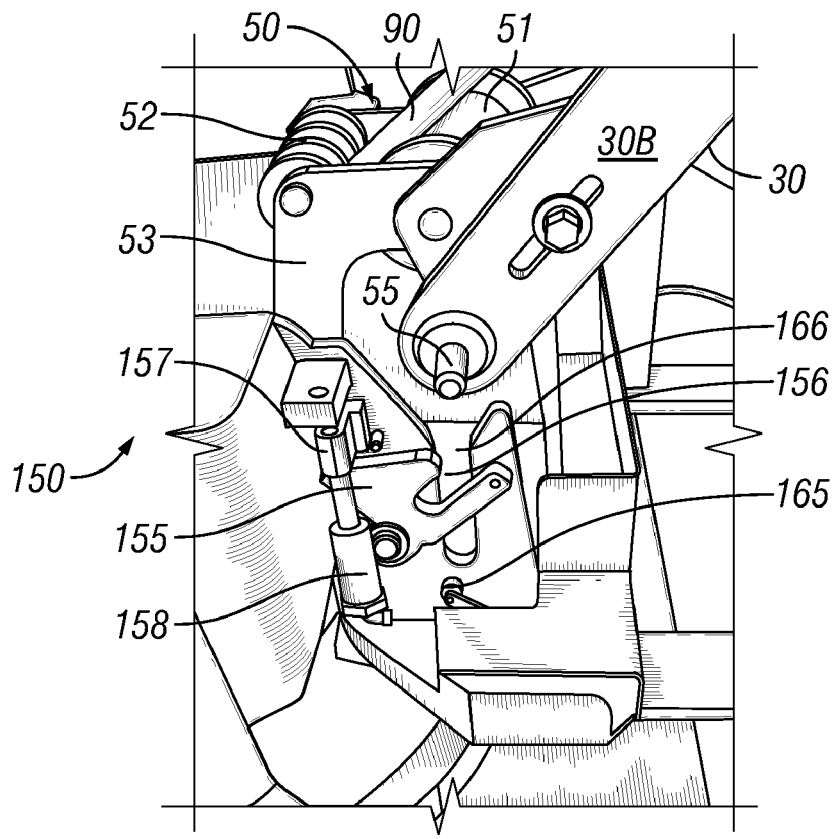
FIG. 6A is a perspective view of one embodiment of a control line retainer assembly coupled to the second end of the control line retainer arm of a control line positioning apparatus. The control line retainer assembly of FIG. 6A comprises a docking member positioned adjacent to one embodiment of a docking assembly that may be disposed adjacent a pipe engagement apparatus and releasably coupled to the control line retainer arm.
Figure 6B:
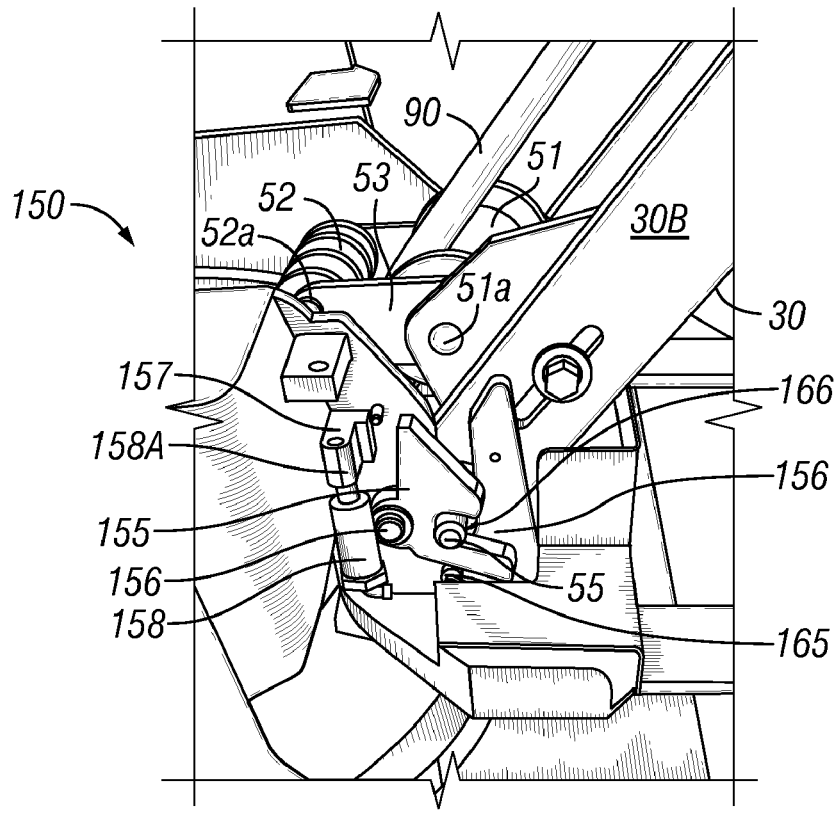
FIG. 6B is a perspective view of the control line retainer arm of FIG. 6A after the control line retainer arm and the docking member thereon are lowered to engage the docking assembly and releasably couple to the docking assembly, and the docking member of the control line retainer assembly is releasably captured within a pivotable docking wheel of the docking assembly.

FIG. 5 illustrates the use of one embodiment of a docking assembly 150 with the control line positioning apparatus 10 illustrated in FIGS. 1-4, the docking assembly 150 comprising a rotating wheel or a Geneva wheel 155 pivotally coupled to rotate between an open position (as shown in FIG. 6A) to receive a docking member 55 protruding from the control line retainer assembly 50 on the control line retainer arm 30, and a closed position (as shown in FIG. 6B) to secure the docking member 55 within the docking assembly 150 and thereby couple the control line retainer arm 30 in the removed position. The rotating wheel or Geneva wheel 155 shown in FIG. 6A pivots about a wheel pivot 156 adjacent to a stationary receiving slot 166 of the docking assembly 150 and may be spring biased (spring not shown in FIG. 6A) towards its open position shown in FIG. 6A. The position of the control line retainer arm 30 shown in FIG. 6A is slightly elevated above the docking assembly. The docking member 55 of the control line retainer assembly 50 is generally vertically aligned with the stationary receiving slot 166 of the docking assembly 150 so that, as the control line retainer arm 30 is lowered by gravity or by operation of the cylinder 13 (not shown in FIG. 6A—see FIGS. 1-4) from the position in FIG. 6A, the docking member 55 is received generally simultaneously into the receiving slot 166 and also into the slot 156 of the rotating wheel or Geneva wheel 155 to rotate the wheel 155 clockwise about its pivot 156 as the docking member 55 is moved towards the bottom of the stationary receiving slot 166.

It should be understood that, as the control line retainer arm 30 is moved from the position shown in FIG. 6A to the coupled position shown in FIG. 6B, the protective shield 53 may be received into a space intermediate the pipe string 80

(not shown in FIG. 6A—see FIGS. 1-4) and the docking assembly 150 to shield the portion of the control line 90 generally below the primary roller 51 from the moving components in the operating zone of the pipe engaging apparatus 70 (not shown in FIG. 6A—see FIGS. 1-4).

The movement of the rotating wheel or Geneva wheel 155 from its open position shown in FIG. 6A to its coupled and closed position shown in FIG. 6B may, in one embodiment, be sensed by a toggle sensor 165 pivotally coupled and positioned adjacent to the rotating wheel or Geneva wheel 155 so that rotation of the wheel 155 to its closed position (as shown in FIG. 6B) toggles the toggle sensor 165 to, for example, open a valve to actuate a wheel blocker cylinder 158 to reposition wheel blocker 158A into the path of the rotating wheel or Geneva wheel 155 to prevent the wheel 155 from returning to its open position and from releasing the control line retainer arm 30 from the removed position corresponding to the coupling with the docking assembly 150.

FIG. 6B is the perspective view of FIG. 6B after the docking member 55 is received into the stationary receiving slot 166 to rotate the rotating wheel or Geneva wheel 155 from the open position to its closed position, and after the wheel blocking cylinder 158 is actuated by depression of the toggle sensor 165 to reposition the wheel blocker 158A to secure the wheel 155 in the closed position. In one embodiment, the wheel blocking cylinder 158 may be spring-biased to the position shown in FIG. 6B to require positive fluid pressure to remove the wheel blocker 158A from the path of the wheel 155 to release the retainer arm 30 from the docking assembly 150.

Figure 7A:
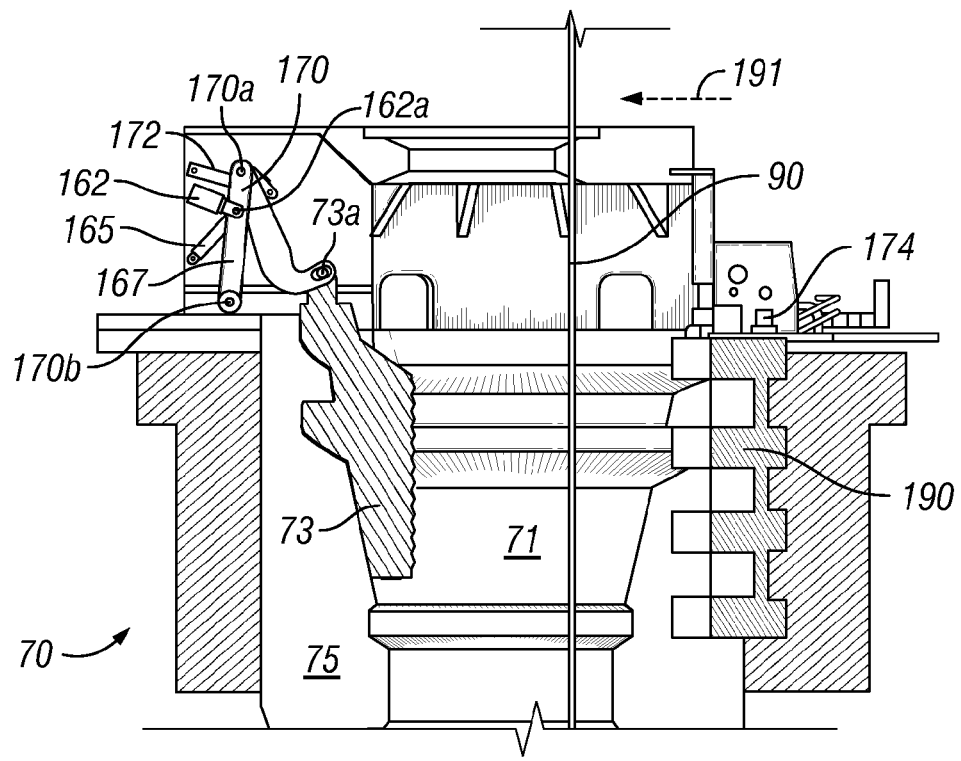
FIG. 7A is an elevational cross-section view of one embodiment of a spider that may be used to engage and grip a pipe string, and to cooperate with a position sensor that senses the movement of the control line retainer arm to a removed position to restrain the control lines coupled to the control line retainer arm from entering the zone of operation of the spider. The position sensor may be used to prevent the slips of the spider from engaging a pipe string (not shown in FIG. 7A) until the control line retainer arm of the control line positioning apparatus is in the removed position.

In one embodiment, the movement of the wheel blocker 158A into the path of the rotating wheel or Geneva wheel 155 may correspond to the release of a blocking member in the pipe engaging apparatus 70 to enable the pipe engaging apparatus to move from an open position to a closed position to engage and support the pipe string 80. For example, FIG. 7A is an elevation cross-section view of one embodiment of a spider 70 to releasably engage and grip a pipe string 80, and to cooperate with the position sensor 174 to prevent the slips 73 of the spider 70 from engaging a pipe string (not shown in FIG. 7A) until, for example, a position sensor 174 detects that the control line positioning arm 30 is in the removed position. FIG. 7A shows a slip positioning linkage 170 to position a set of slips 73 within the tapered bowl 71 of a spider 70. The slip linkage 170 may be powered by a cylinder (not shown) to retract the slips 73 from the tapered bowl 71 to the removed position of FIG. 7A, where the slips 73 are captured by a blocking member, such as a slip retainer hook 172, to prevent inadvertent engagement of the slips 73 with the pipe string 80 when the control line retainer arm 30 (see FIGS. 6A and 6B) is not in the removed position. Once the slips 73 are captured in the removed position by the slip retainer hook 172, as shown in FIG. 7A, the slip retainer hook 172 may be held in the removed position by hook release cylinder 173 and, in one embodiment, may not release slips 73 to engage pipe string 80 until position sensor 174 is depressed by the control line retainer arm 30 (not shown in FIG. 7A—see FIG. 7B) to unlock the slip retainer hook 172.

As shown in FIG. 7A, a spring-biased slip release cylinder 165 may be coupled to a spring-biased slip retainer hook 172 to retain the slips 73 of spider 70 in the open and disengaged position until fluid pressure is provided to slip release cylinder 165 to override the spring-bias, pivot the slip retainer hook 172 and to thereby release the slips 73 of the spider 70 to engage and close on the portion of the pipe string 80 within the tapered bowl of the spider 70.

Figure 7B:
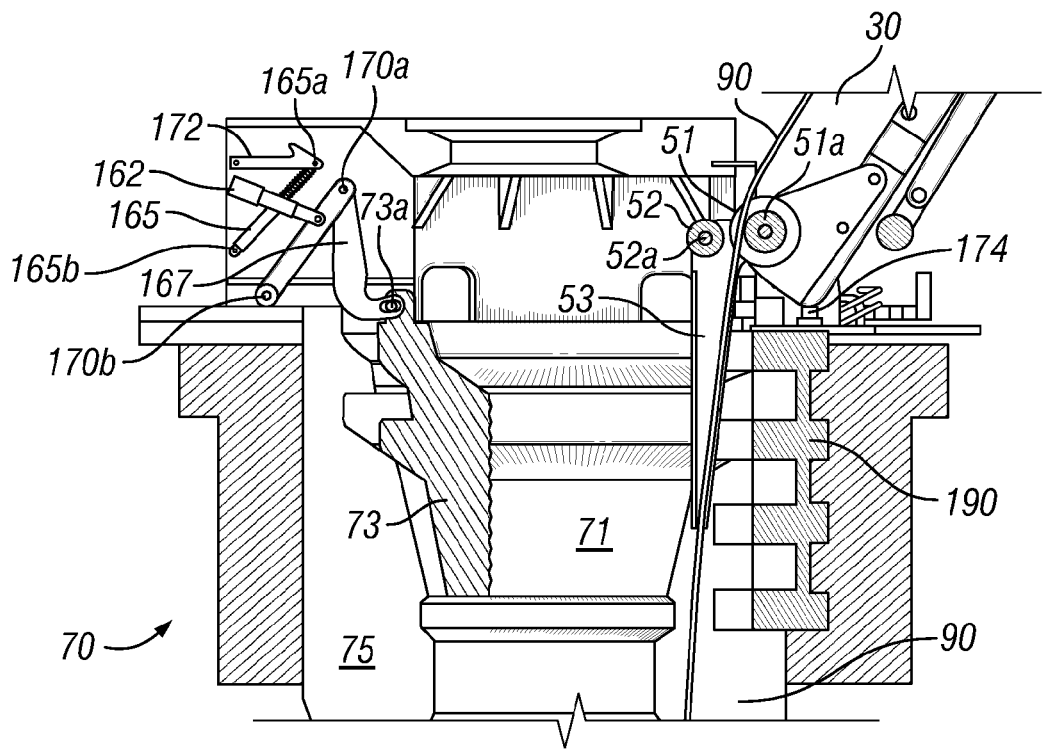
FIG. 7B is the elevational cross-section view of FIG. 7A after the control line retainer arm moved to the removed position to activate the position sensor, and after the spider is enabled to engage and support the pipe string (not shown in FIG. 7A). The activation of the position sensor may automatically enable engagement of the spider by, for example, opening a valve to supply pressurized fluid to disable a blocking member, such as a cylinder.

FIG. 7B is the elevation cross-section view of FIG. 7A after control line retainer arm 30 engages the position sensor 174. The activation of the position sensor 174 may automatically enable the spider 70 by, for example, opening a valve to supply pressurized fluid to the hook release cylinder 173 to override the spring bias and to release the slip retainer hook 172 and to release the slips 73 to enter the tapered bowl 71. It should be understood that other effective position sensors may be used to prevent engagement of the pipe engaging apparatus until the control line retainer arm is detected in its removed position to restrain the control lines from entering the operating zone of the pipe engaging apparatus.

Figure 8A:
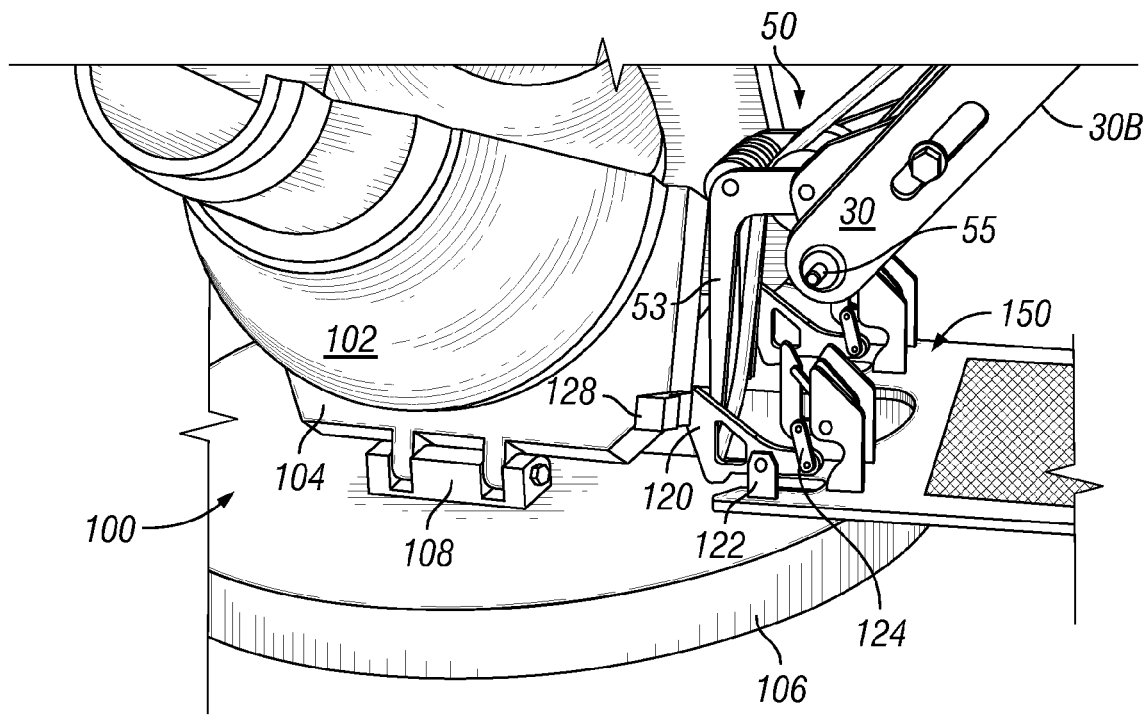
FIG. 8A is a perspective view of a control line retainer assembly coupled to a control line retainer arm and positioned adjacent to a docking assembly that cooperates with a CLS landing spear. The CLS landing spear is shown restrained in the open position by a blocking member deployed to prevent closure of the CLS landing spear to protect the control line and prevent inadvertent closure of the halves of the CLS landing spear around the pipe string until the position sensor detects the movement of the control line retainer arm to the removed position.

FIG. 8A is a perspective view of one embodiment of a control line retainer assembly 50 coupled to the second end 30B of control line retainer arm 30 of a control line positioning apparatus (not shown). The control line retainer assembly 50 of FIG. 8A is docked with an alternate embodiment of a docking assembly 150 adjacent to a CLS landing spear 100 in an open position. The docking assembly 150 shown in FIG. 8A deploys a rotatable blocking member 120 to protect the control line 90 by obstructing pivotal closure of the halves 102 of the CLS landing spear 100 about hinges 108 to surround pipe string 80.

Figure 8B:
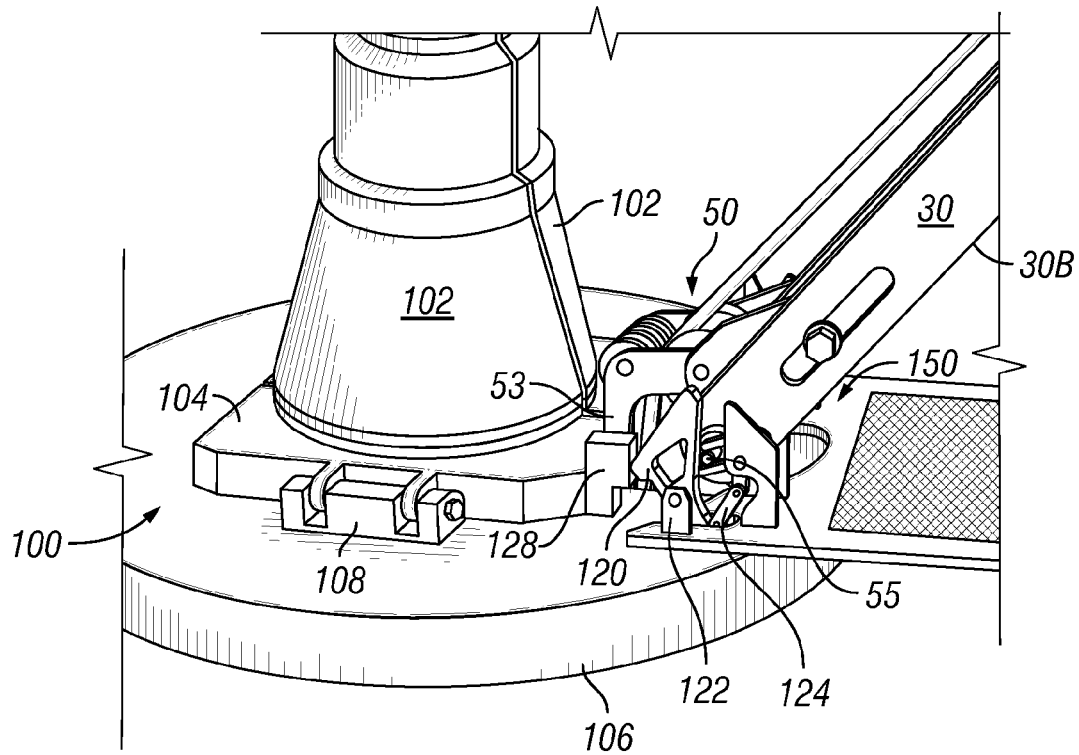
FIG. 8B is the perspective view of FIG. 8A after the control line retainer arm is moved to the removed position and releasably coupled to the docking assembly. The movement of the control line retainer arm to the removed position to restrain the control lines from entering the operating zone of the CLS landing spear, and the releasable coupling of the control line retainer arm with the docking assembly, automatically withdraws the blocking member to a retracted position to permit pivotal closure of the halves of the CLS landing spear around the pipe string.

FIG. 8B is the perspective view of FIG. 8A after the docking assembly 150 is releasably coupled to the control line retainer arm 30 of the control line positioning apparatus. In the embodiment of FIG. 8B, the coupling of the control line retainer arm 30 with the docking assembly 150 urges docking member 55 to reposition link 124 to rotate blocking member 120 to the retracted position shown in FIG. 8B and to thereby to permit pivotal closure of the halves 102 of the CLS landing spear 100 to surround the pipe string (not shown). The docking of the control line retainer arm 30 adjacent to the CLS landing spear 100 removes the control lines 90 from the operating zone of the CLS landing spear 100. It should be understood that the embodiment of the docking member and blocking member disclosed in connection with FIGS. 8A and 8B does not include any non-mechanical devices, such as cylinders, to implement the safety interlock system.

Figure 9A:
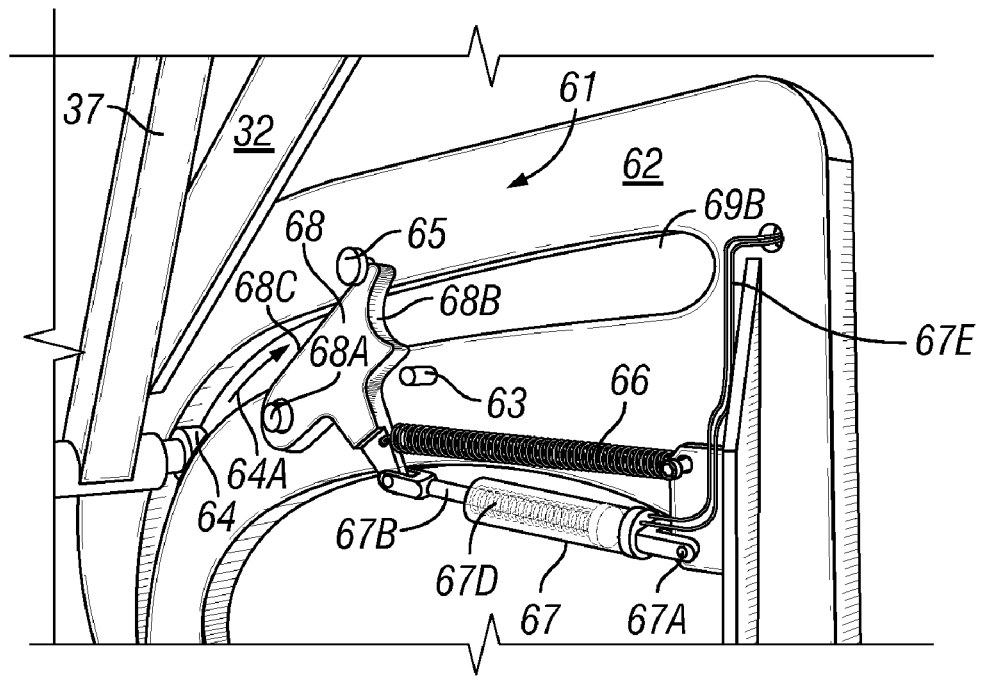
FIG. 9A is a perspective view of one embodiment of an automatic safety latch to allow the control line retainer arm to be moved by a drive member to a raised position, but to prevent inadvertent lowering of the control line retainer arm back to the removed position until the safety latch is manually disabled by rig personnel.

FIG. 9A is a perspective view of one embodiment of an automatic safety latch 61 to allow the control line retainer arm 30 to be raised by the drive member (not shown) to a raised position, but to prevent inadvertent lowering of the control line retainer arm until the safety latch 61 is manually disabled by rig personnel. FIG. 9A is a perspective view of one embodiment of a retainer arm safety latch 61 to selectively to permit raising of the control line retainer arm 30 to the raised position (see FIG. 4), but to block the control line retainer arm 30 from being returned to the removed position until an operator overrides the safety latch 61. The safety latch of FIG. 9A comprises a pivotal track blocker 68 with a pivot 68A and a spring-biased cylinder 67. The cylinder 67 may be spring biased to pivot the track blocker 68 against the stop 65 and into the safety position shown in FIG. 9A. The cylinder 67 may be energized by a supply of pressurized fluid through conduit 67E to contract the cylinder 67 and override the springs 67D and auxiliary spring 66 and to pivot the track blocker 68 out of the safety position. The cylinder 67 may also be extended by movement of the follower 39 through the portion of the track 69 adjacent to the track blocker 68 in the direction of the arrow 64A and toward the upper end 69B of the track 69.

Figure 9B:
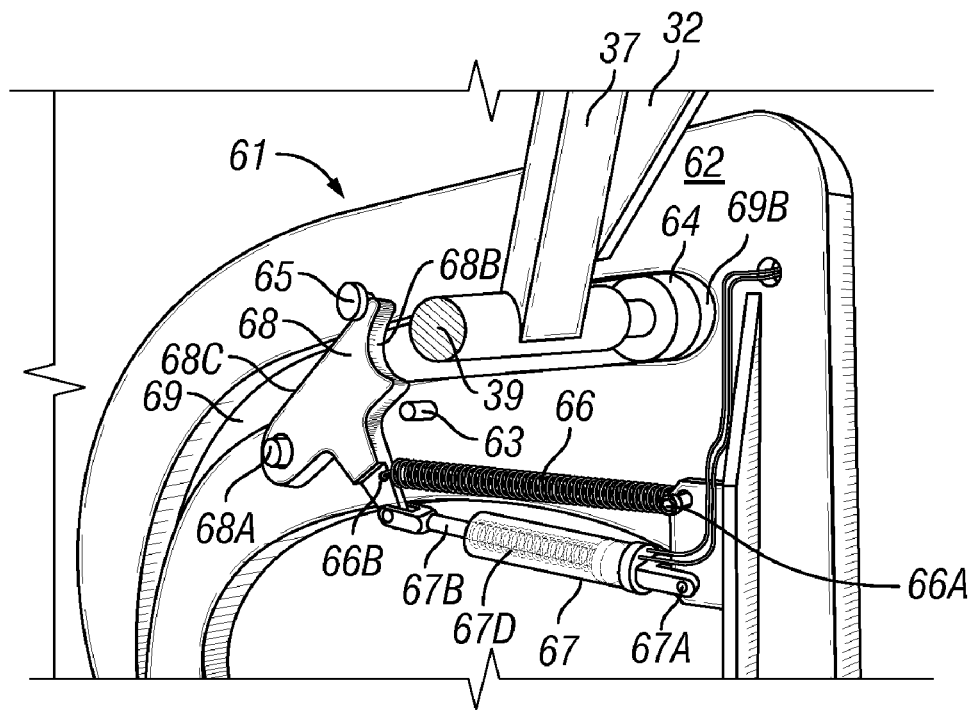
FIG. 9B is the perspective view of FIG. 9A after the follower on the control line retainer arm has moved through the portion of the track adjacent to the safety latch to enter the portion of the track that may correspond to the raised position of the control line retainer arm.

FIG. 9B is the perspective view of FIG. 9A after the follower 39 on the retainer arm has moved through a portion of the track 69 adjacent to the safety latch 61 to enter the portion of the track 69 corresponding to the raised position of the retainer arm. FIG. 9B is the perspective view of FIG. 9A after the follower 39 has traversed the portion of the track 69 past the safety latch 61 and into the upper end 69B of the track 69.

The track blocker 68 pivots out of the blocking position shown in FIG. 9A due to the camming action of the follower 39 along the ramped surface 69C of the track blocker 68 as it is driven along the path of the track 69 in the direction of arrow 64A. It should be understood that in the event that the retainer arm 30 and the follower 39 are driven along the track 69 in the reverse direction and against the blocking surface 68B of the track blocker 68, the track blocker 68 will be pivotally urged against the stop 65, and that the control line retainer arm 30 (not shown in FIG. 9B) will be blocked from being returned to the removed position with the follower 39 nearer the lower end 69A of the track 69 unless the track blocker 68 is pivoted out of the safety position shown in FIGS. 9A and 9B.

Figure 9C:
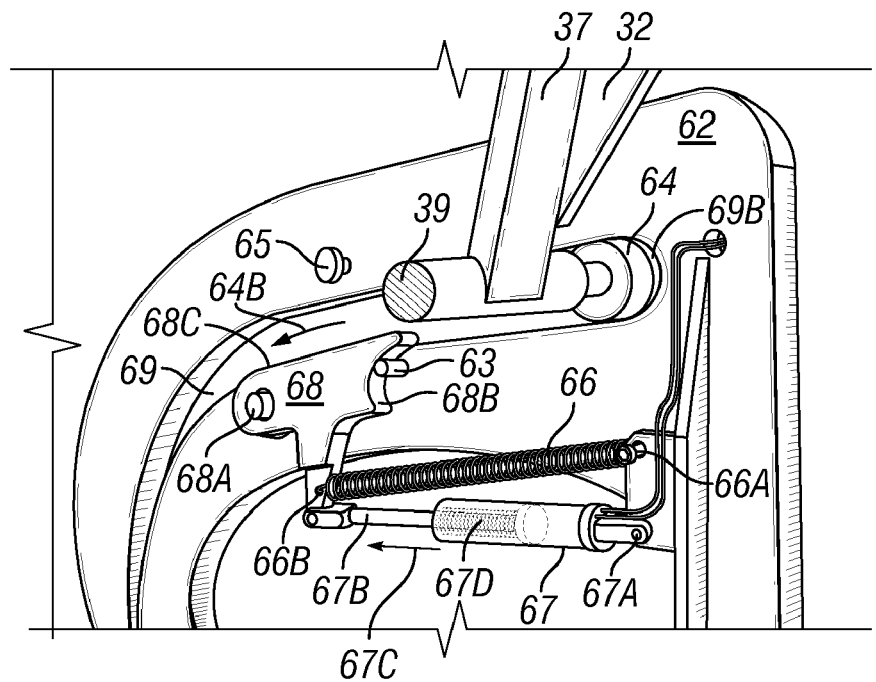
FIG. 9C is the perspective view of FIG. 9B after the safety latch is disabled to enable lowering of the control line retainer arm back toward the removed position. The safety latch shown in FIGS. 9A-9C is an example of a fail-safe safety latch.

FIG. 9C is the perspective view of FIG. 9B with the safety latch disabled to permit lowering of the retainer arm back toward the removed position. The safety latch shown in FIGS. 9A-9C is one example of a fail-safe safety latch. FIG. 9C shows the safety latch 61 disabled by a supply of pressurized fluid to cylinder 67 to override the spring bias an to permit passage of the follower 39 in the direction of arrow 64B and the corresponding lowering of the control line retainer arm back toward the removed position. The safety latch 61 may be disabled, for example, by a rig personnel depressing a button (not shown) to open a valve (not shown) feeding pressurized fluid through fluid conduit 67E and to the cylinder 67 to override the bias of the springs 66 and 67D to pivot the track blocker 68 out of the safety position as shown in FIG. 9C, and by clearing the track 69 to permit the follower 39 to move along the track 69 in the direction of arrow 64B.

Figure 10:
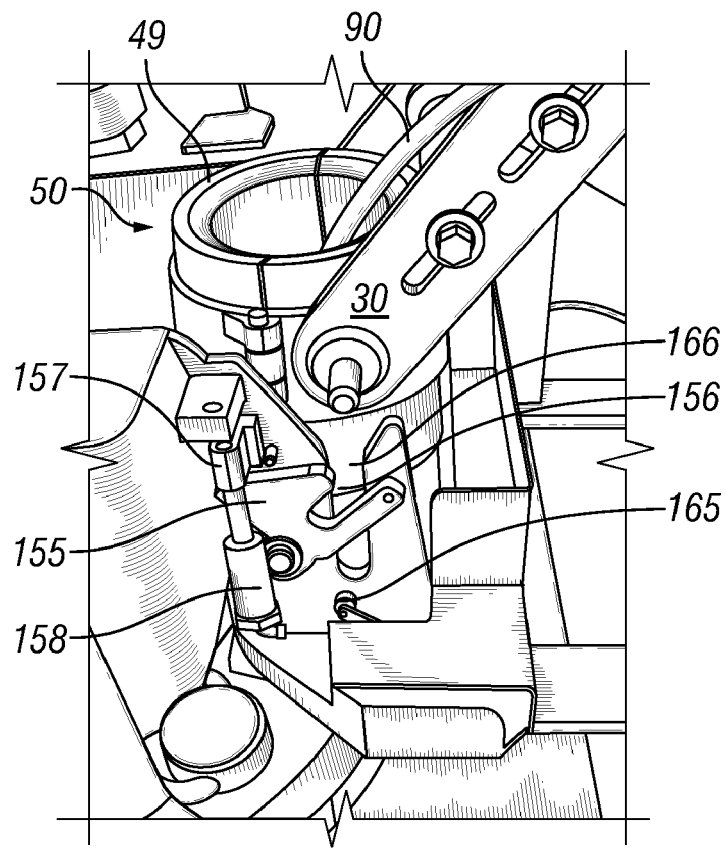
FIG. 10 is a perspective view of an alternative control line retainer assembly that may be coupled to the control line retainer arm of the control line positioning apparatus to couple one or more control lines to the control line retainer arm.

FIG. 10 is a perspective view of an alternative control line retainer 50 coupled to the second end 30B of the control line retainer arm 30 of a control line positioning apparatus. The alternative retainer assembly 50 comprises a generally hollow sleeve 49 to surround and position the control line 90. The interior of the sleeve 49 may comprise a material having favorable lubricity for sliding engagement with the control lines, and may be lubricated, to produce favorable low-friction sliding of the control line 90. It should be understood that, although the alternative retainer assembly 50 of FIG. 10 is shown engaging a docking assembly to secure the retainer arm in the removed position, the alternative retainer assembly may be used without a docking assembly.

Figure 11:
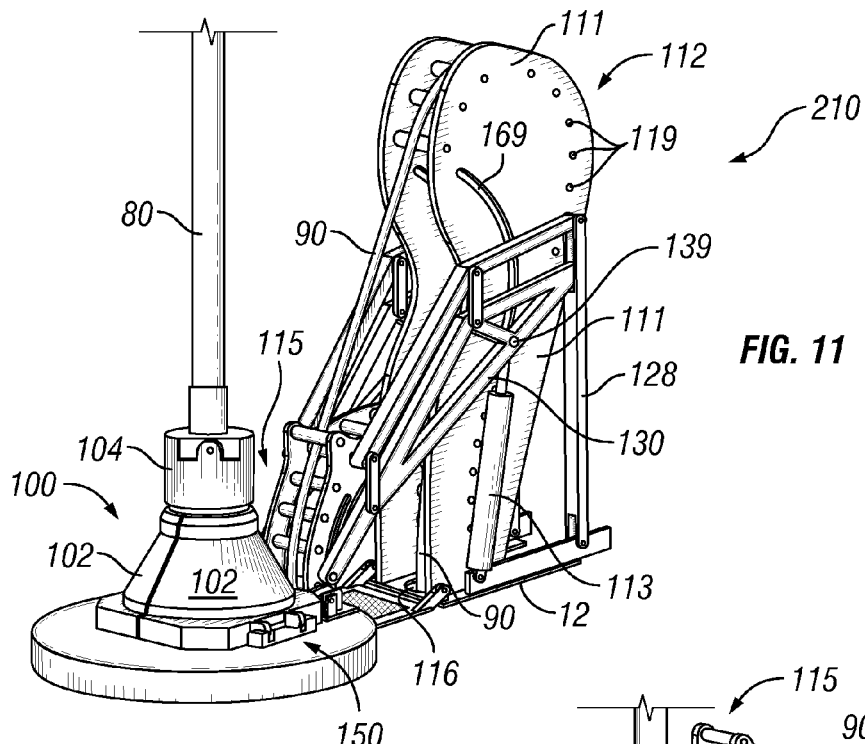
FIG. 11 is a perspective view of an alternate embodiment of the control line positioning apparatus comprising a rotatable and translatable control line retainer arm positionable by a drive member along the path of a track between a removed position and a raised position. The control line retainer arm is shown in FIG. 11 is in the removed position and coupled to a docking assembly disposed adjacent to, and cooperative with, a CLS landing spear. The alternate embodiment of the control line positioning apparatus of FIG. 11 also comprises an ascending control line feed pathway having an inlet proximate the base to receive a control line feed and an outlet proximate to the control line retainer arm to redirect the control line feed to a control line retainer assembly coupled to the control line retainer arm.
Figure 12:
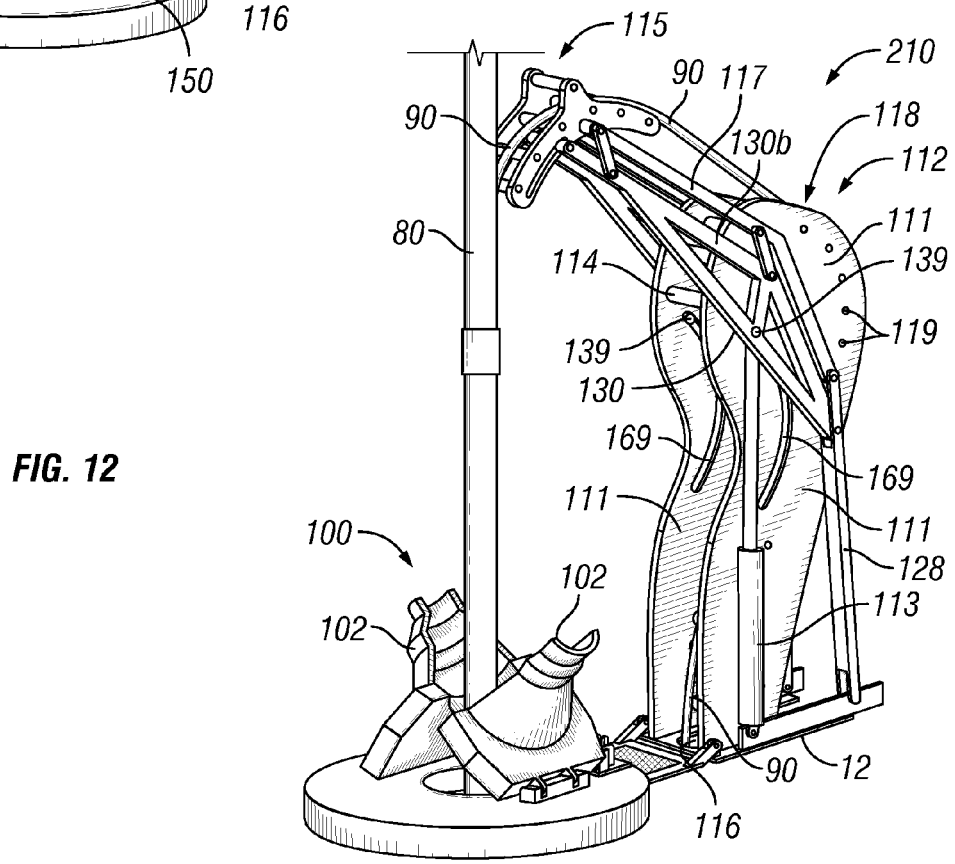
FIG. 12 is the perspective view of the control line positioning apparatus of FIG. 11 after the control line retainer arm is moved by the drive member to a raised position to position the control line along a portion of the pipe string above the pipe engagement apparatus. The drive member is shown in an extended condition after it has moved the follower on the control line retainer arm along the path of the track.

FIG. 11 is a perspective view of an alternate embodiment of the control line positioning apparatus 210 comprising a rotatable and translatable control line retainer arm 130 positionable by a drive member 113 between a removed position shown in FIG. 11 and a raised position shown in FIG. 12. The embodiment of the control line retainer arm 130 of FIG. 11 is coupled to a docking assembly 150 that cooperates with a CLS landing spear 100 when the control line retainer arm 130 is in the removed position shown in FIG. 11 to restrain the control line 90 from entering the operating zone of the CLS landing spear 100. The alternate embodiment of the control line positioning apparatus 210 of FIG. 11 also comprises an ascending control line feed pathway 112 having an inlet 116 proximate the base 12 to receive a control line feed and an outlet 118 generally above or proximate to the control line retainer arm 130 to direct the control line feed to a control line retainer assembly 115 coupled to the second end 130B of the retainer arm.

FIG. 12 is the perspective view of the control line positioning apparatus 210 of FIG. 11 after the halves 102 of the CLS landing spear 100 are unloaded and pivoted to the open position, and after the control line retainer arm 130 is moved by the drive member 113 from the removed position shown in FIG. 11 to the raised position shown in FIG. 12. The drive member 113 is shown in an extended condition after it has moved the follower 139 on the control line retainer arm 130 along the path of the track 169.

Figure 13:
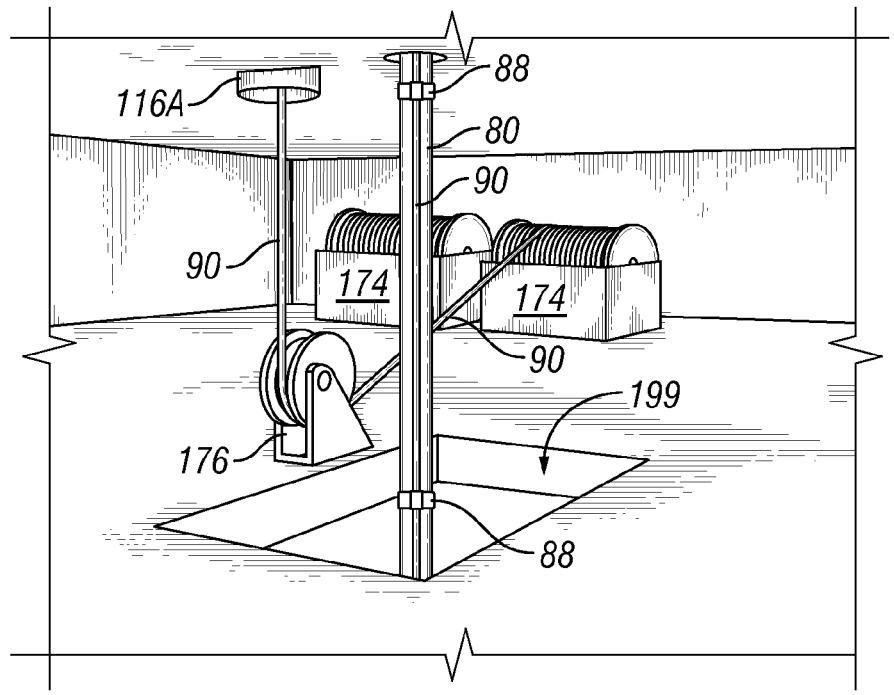
FIG. 13 is a perspective view of control line reels stored in a sub-space beneath a rig floor supporting a control line positioning apparatus. The sub-space may be used to store and supply control line to a control line positioning apparatus through an aperture in the rig floor.

FIG. 13 is a perspective view of control line storage reels stored in a rig sub-space beneath a rig floor supporting a control line positioning apparatus (not shown in FIG. 13). The sub-space may be used to store and supply control line 90 to a control line positioning apparatus through an aperture 116A in the rig floor that may, in one embodiment, be aligned with the inlet 116 to an ascending pathway 112 on a control line positioning apparatus (see, for example, the control line positioning apparatus 210 in FIGS. 11 and 12). A sheave 176 may be used to redirect the control line feed from the reel 174 into the aperture 116A.

Figure 14:
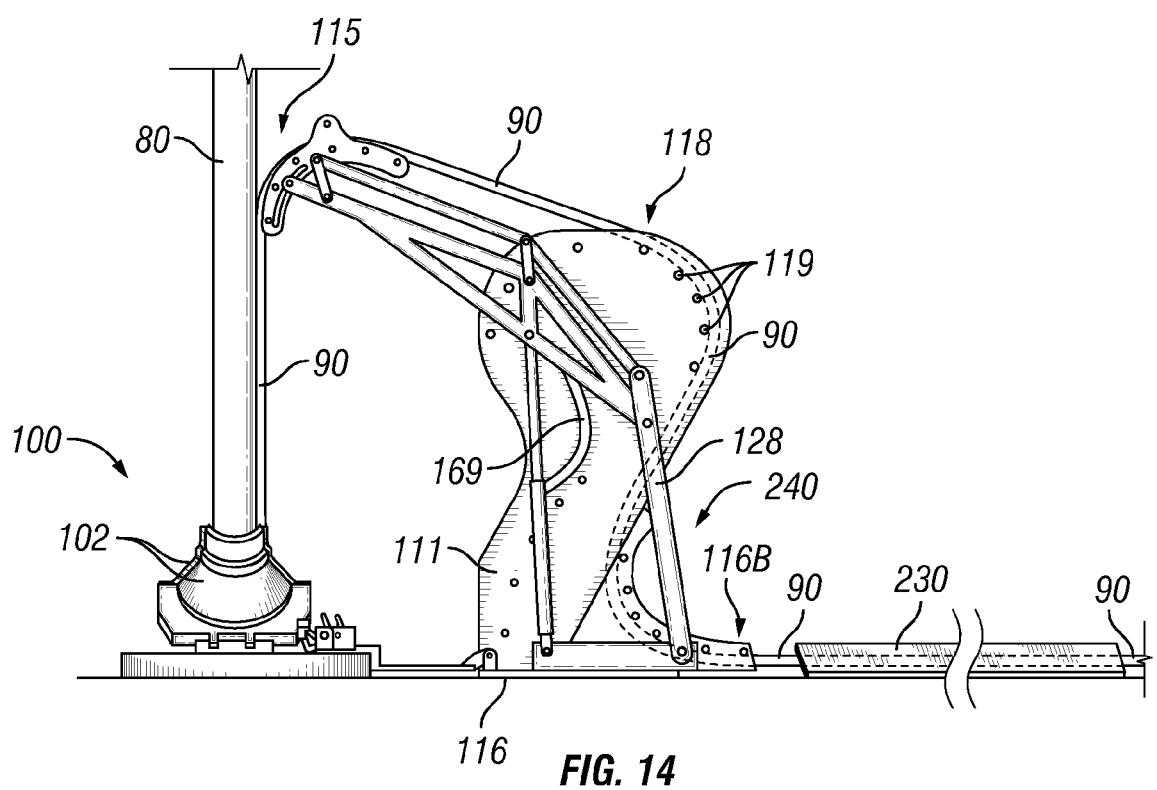
FIG. 14 is a side elevation cross-section view of the embodiment of the control line positioning apparatus of FIG. 12 revealing the ascending control line feed pathway comprising a plurality of rolling members supported by one or more frames connected to the track that engages the follower on the control line retainer arm.

FIG. 14 is an elevation cross-section view of an alternate embodiment of a control line positioning apparatus 210 revealing the path of the ascending control line feed pathway 112 comprising rolling members 114 (not shown, but positions indicated by rolling member axles 119) supported by one or more frames 111 connected to the track 169 that engages and guides the follower 139 of the control line retainer arm 130. Rolling member axles 114 may supported rolling members 114 that are strategically positioned to define the ascending control line feed pathway 112 and to prevent bending any portion of the control line feed beyond the minimum bend radius. In one embodiment, the control line feed pathway may be adjustable. The inlet 116B of the embodiment of the ascending control line feed pathway 112 of FIG. 14 is aligned with the outlet of a rig floor-mounted control line feed pathway, as will be described below in connection with FIGS. 15 and 16.

It should be understood that the ascending control line pathway 112 may be adapted to receive a control line feed through an aperture 116 in the rig floor, as shown in FIGS. 11 and 12, from an outlet 116B of a rig floor-mounted control line pathway, as shown in FIG. 14, or from a control line feed in other locations.

Figure 15:
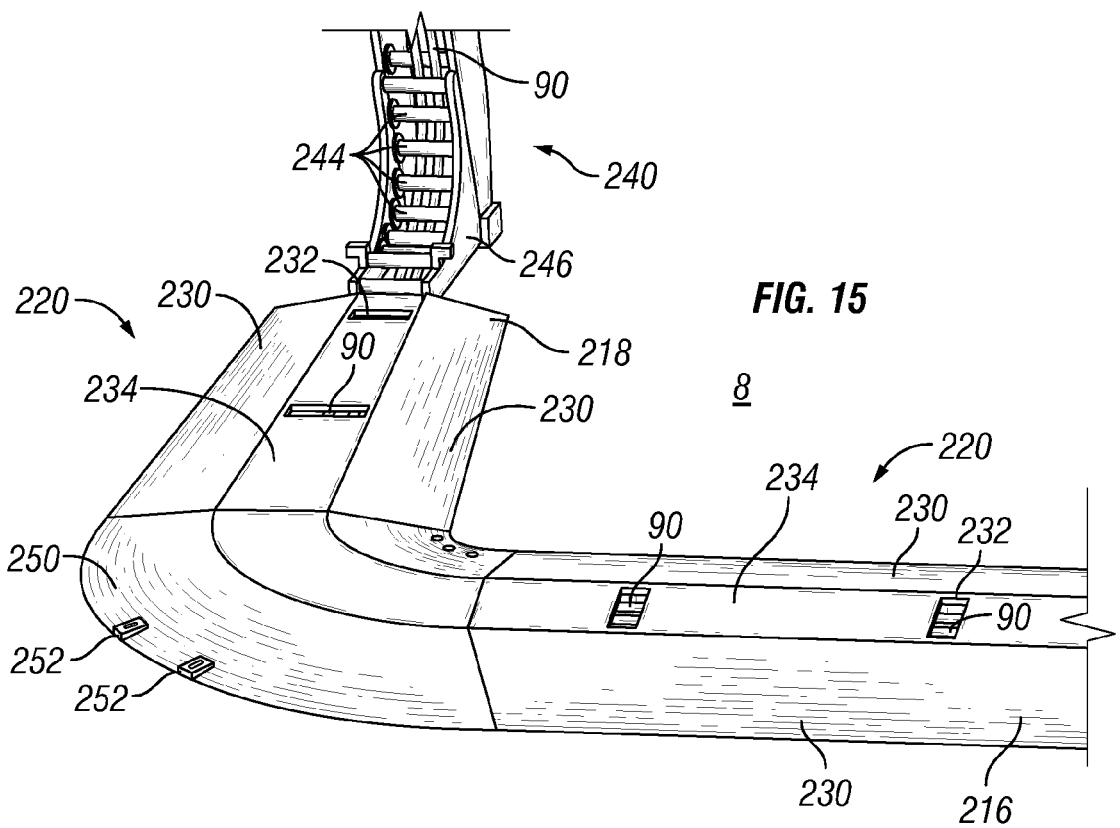
FIG. 15 is a perspective view of one embodiment of a rig floor-mounted control line pathway having an inlet to receive a control line feed, an outlet to discharge the control line feed to a control line positioning apparatus, two straight channel portions and a bend portion intermediate the straight channel portions and intermediate the inlet and the outlet. The rig floor-mounted pathway provides a protected control line feed channel through which one or more control lines may be fed to a control line positioning apparatus.
Figure 16:
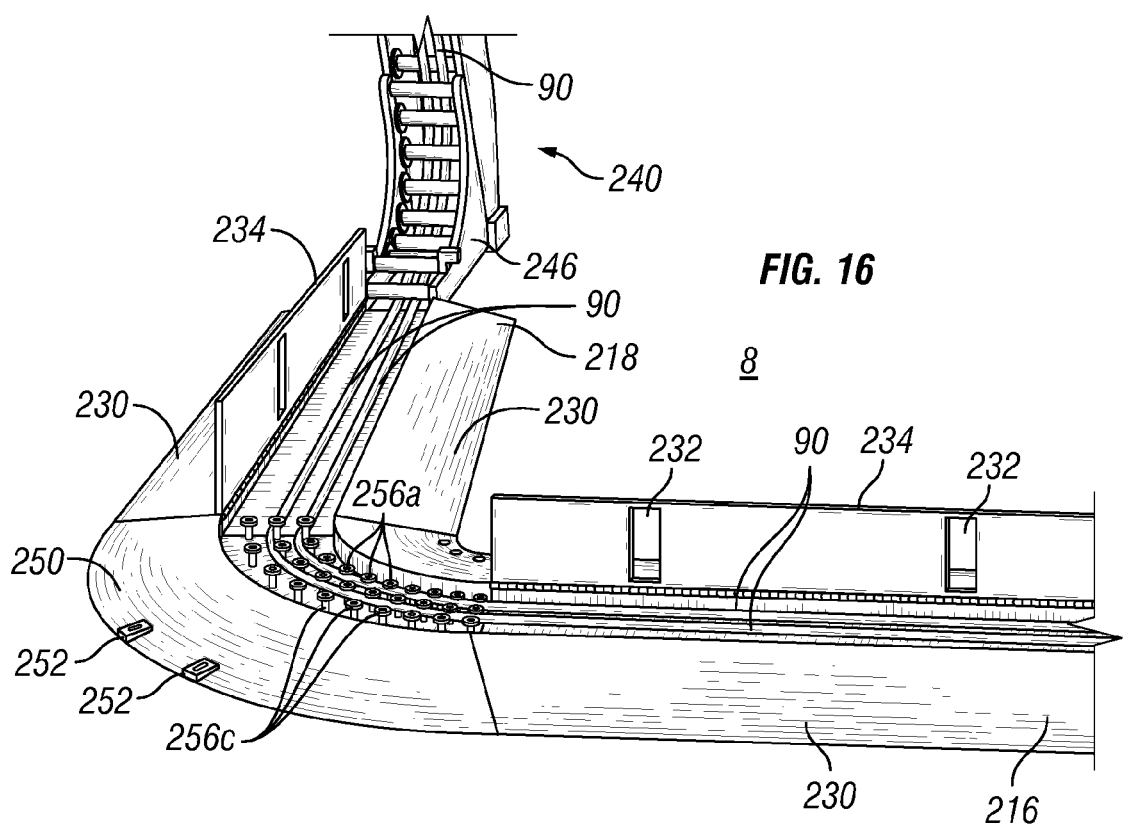
FIG. 16 is the perspective view of FIG. 15 after hinged channel covers on the straight channels of the pathway are pivoted to an open position to provide access to the control line feed channel. The channel cover is removed from the bend portion of the control line feed pathway.

FIG. 15 is a perspective view of one embodiment of a rig floor-mounted control line pathway 230 having an inlet 216 to receive a control line feed, an outlet 218 to discharge the control line feed to an inlet 116B to an ascending control line feed pathway of a control line positioning apparatus (not shown in FIG. 15), and a bend portion 250 intermediate two generally straight control line channels 220. The embodiment of the rig floor-mounted pathway of FIG. 15 provides a protected channel through which one or more control line feeds may be delivered to a control line positioning apparatus. The rig floor-mounted pathway 220 of FIG. 15 may comprise an elongate cover support 230 in a spaced-apart relationship from an adjacent cover support 230 to define a channel therebetween. In one embodiment, the cover supports 230 may each comprise a triangular cross-section to provide a ramp over which personnel and equipment may pass. A channel cover 234 may be hingedly coupled to one of the cover supports 230 and pivotable between a closed position to protect the control line feed channel there beneath, as in FIG. 15, and an open position to provide access to the control line feed channel, as shown in FIG. 16. Windows 232 in the channel cover 234 may provide rig personnel with visual access to at least a portion of the control line feed channel with the covers 234 in the closed position.

FIG. 16 is the perspective view of FIG. 15 after hinged channel cover 234 on the straight portions of the rig floor-mounted pathway are pivoted to an open position to provide access to the control line feed channel and to the control lines 90 therein. A cover on the bend portion 250 is also removed to reveal an array of rolling members 256a-256c for maintaining a spaced-apart relationship between the control lines 90 as the control lines are redirected in the bend portion into a subsequent channel portion.

It should be noted that the rig floor-mounted control line pathway may be secured to the rig floor 8 using fasteners that, when the cover supports 230 are slid and secured in place, are hidden from view and access in order to prevent tripping or snagging hazards, as illustrated on the straight portions of the pathway 220 in FIGS. 15 and 16. Alternately, portions of the rig floor-mounted control line pathway may be secured to the rig floor using visible, external fasteners, as shown for the bend portion 250 of the pathway in FIGS. 15 and 16.

Figure 17:
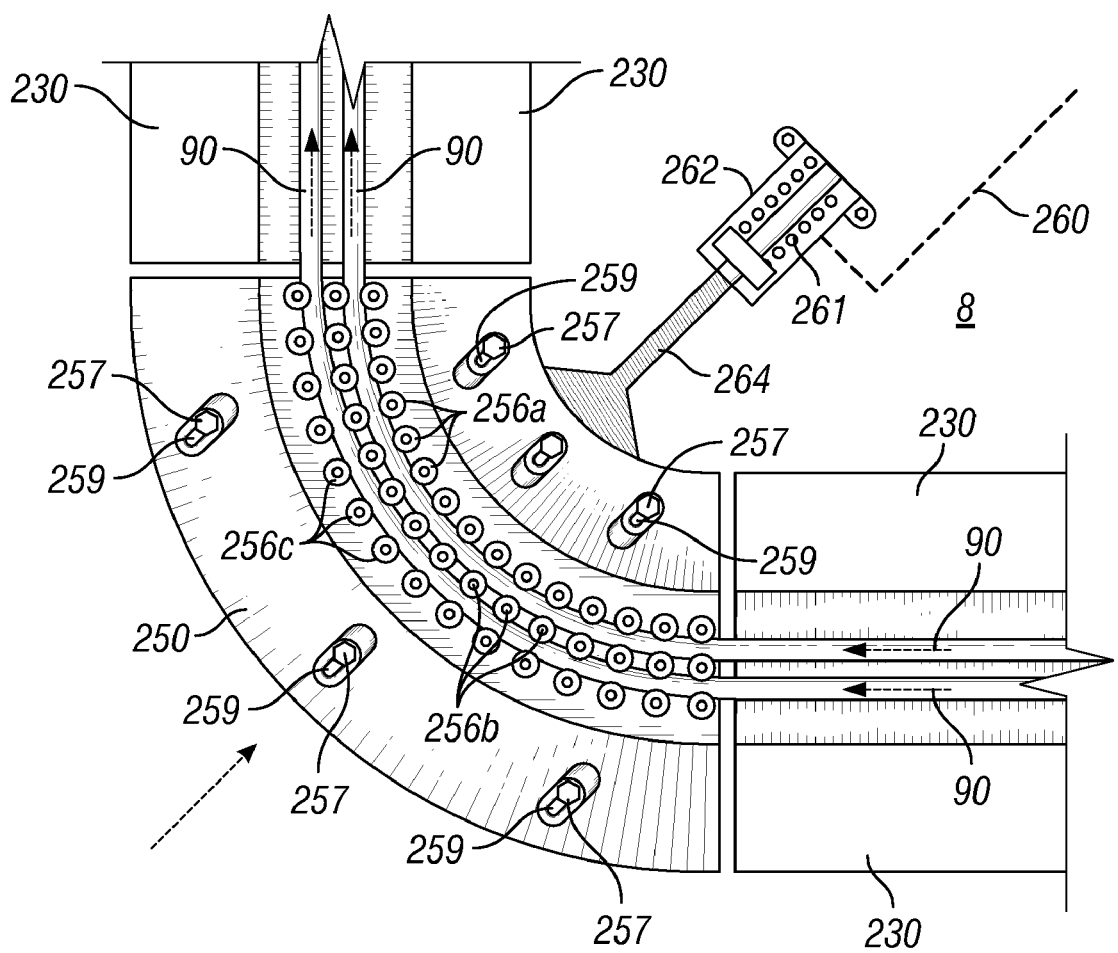
FIG. 17 is a top plan view of the bend portion of the floor-mounted control line pathway of FIG. 16 showing one possible arrangement of rolling members within the bend portion, and also showing one embodiment of a load cell coupled to the bend portion to facilitate measurement of the tension of control lines being fed through the pathway to a control line positioning apparatus.

FIG. 17 is a top plan view of the array of rolling members 256a-256c within the bend portion 250 of the floor-mounted control line pathway 220 of FIGS. 15 and 16 showing one possible arrangement of an array of rollers within the bend portion 250, and also showing one embodiment of a load cell 262 coupled to the rig floor 8 and to the bend portion 250 to facilitate measurement of the tension of the control lines 90. The bend portion 250 may be movably secured to the rig floor using fasteners 257 slidably received within slots 259 to permit limited movement of the bend portion, as restrained by a spring 261 biasing the bend portion 250 in a direction opposite to the movement urged by tension in the control lines 90 that traverse the array of rolling members 256a-256c. It should be understood that a spring scale, fluid cylinder, strain gauge, or other load measuring device may be used to measure the force imparted to the bend portion 250 as a result of the tension in the control lines 90. It should further be understood that these devices may be used, along with commonly used instruments and devices, to generate a signal 260 corresponding to the measured force imparted by the bend portion 250, and to initiate an alert, display, or automatic emergency shut-down of the control line feed operation as necessary to maintain and protect the control line feed operation, the control line and the related equipment.

Figure 18A:
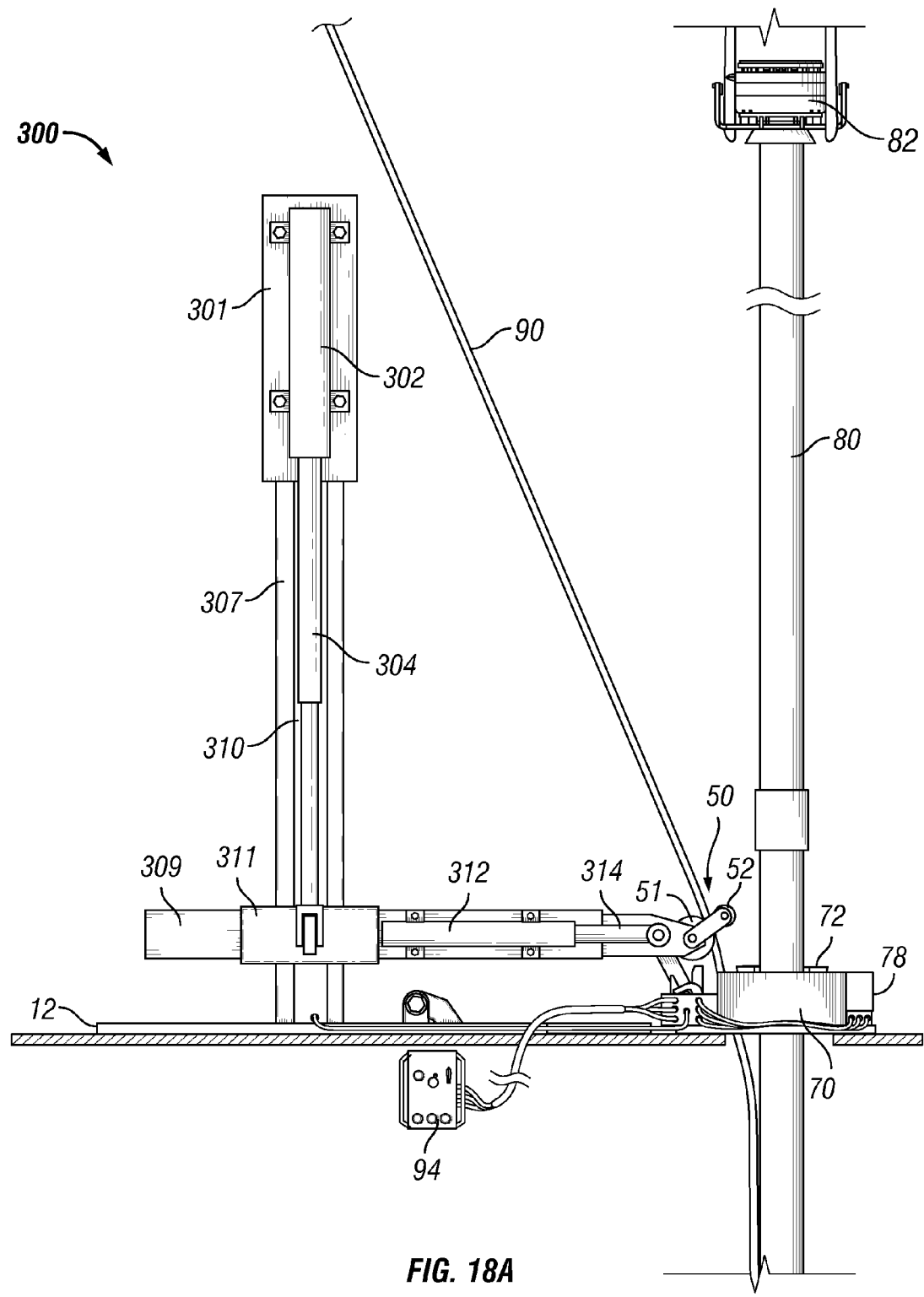
FIG. 18A is an elevation view of one embodiment of a rectilinear control line positioning apparatus with a control line retainer arm in the removed position to restrain the control lines from entering the operating zone of a spider.

FIG. 18A is an elevation view of one embodiment of a rectilinear control line positioning apparatus 300 comprising a control line retainer assembly 50 positionable, in part, by a horizontal cross-slide 309 that is vertically positionable on vertical brace 301 by a vertical lift cylinder 302. The lift cylinder 302 on the brace 301 may retract to lift and extend to lower the horizontal cross-slide 309. The horizontal cross-slide 309 may be positioned vertically by extending and retracting cylinder 302 by controlling a feed of pressurized fluid to the cylinder through conduits (not shown). The horizontal cross-slide 309 is comprises a vertically reciprocating base 311 that is slidably coupled to the brace 301 by the vertical cylinder 302 and by a "T"-shaped rail 310 (not visible in FIG. 18A—see FIG. 18B) received into a corresponding "T"-shaped groove (not shown) in reciprocating base 311. The horizontal slide member 309 is horizontally extendable by operation of cylinder 312 to extend and retract the control line retainer assembly 50.

FIG. 18A shows the control line positioning apparatus 300 with the control line retainer assembly 50 in the removed position to restrain the control lines 90 from entering the operating zone of the spider 70.

Figure 18B:
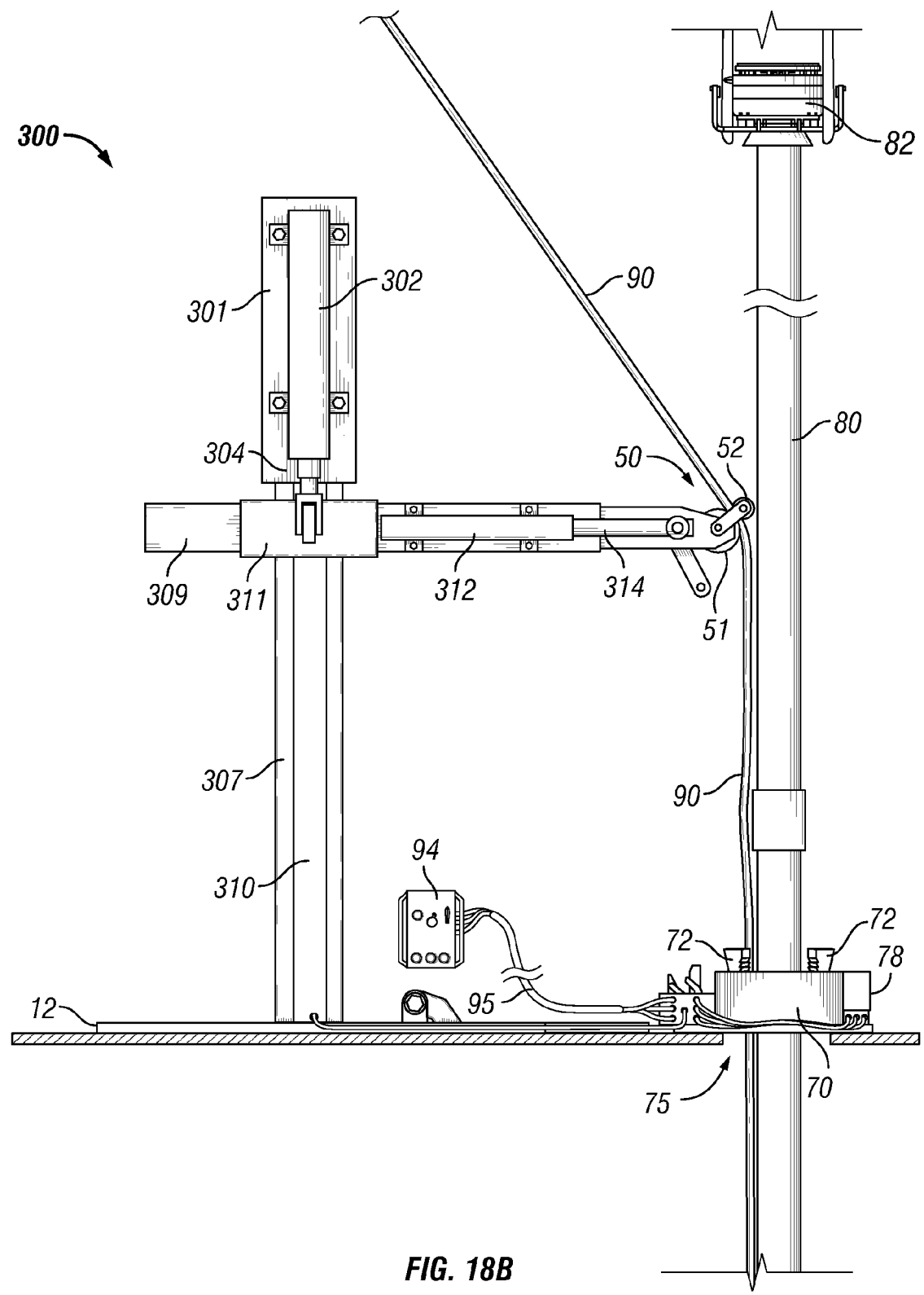
FIG. 18B is the elevation view of FIG. 18B after the control line positioning apparatus is driven by cylinders from the removed position to a raised position to position the control line along a portion of the pipe string above the spider.

FIG. 18B shows the control line positioning apparatus of FIG. 18A after the vertical lift cylinder 302 is retracted to lift horizontal cross-slide 309 and the extension cylinder 312 is used to extend the control line retainer assembly 50 to a raised position proximate the pipe string 80 and to position the control line 90 along a portion of the pipe string 80 above the spider 70 to facilitate clamping of the control line 90 to the pipe string 80.

It should be understood that an "elevator assembly," as used herein, means a vertically movable spider, a casing running tool (CRT) or any other pipe gripping assembly that can be manipulated to raise or lower a pipe string that is supported within the elevator assembly. It should be further understood that "pipe gripping apparatus," as used herein, means an apparatus that can support a pipe string, and specifically includes an elevator assembly and also includes a spider.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

While the foregoing is directed to embodiments of the present invention, other and further embodiments of the invention may be devised without departing from the basic scope thereof, and the scope thereof is determined by the claims that follow.

We claim:

1. A rig floor-mounted pathway to protect one or more control lines to be attached to a pipe string, comprising:
    an enclosed control line channel extending along and adjacent to a rig floor having an inlet and an outlet proximal to a pipe string; and
    at least a portion of the enclosed control line channel configurable between an open position to reveal the one or more control lines and a closed position to substantially cover the one or more control lines;
    wherein one or more control line engaging members are coupled to a sensor to measure a load imparted to the one or more control line engaging members by the one or more control lines.

2. The rig floor-mounted pathway of claim 1 further comprising:
    a bend portion to redirect the one or more control lines in the enclosed control line channel, the one or more control line engaging members being located in the bend portion and comprising at least one of one or more slidably engaging members and one or more rollably engaging members.

3. The rig-floor mounted pathway of claim 2 wherein the one or more control line engaging members are disposed intermediate two or more control lines fed from the inlet through the enclosed control line channel to the outlet.

4. The rig floor-mounted pathway of claim 2 wherein the one or more control line engaging members comprise at least one of a sheave and a roller.

5. The rig floor-mounted pathway of claim 1 wherein the sensor is coupled to a display to indicate tension in the one or more control lines.

6. The rig floor-mounted pathway of claim 1 wherein the sensor generates an excess control line tension indication.

7. The rig floor-mounted pathway of claim 1 wherein the sensor is selected from a group comprising a load cell, a scale, and a strain gauge.

8. A control line apparatus, comprising:
    an enclosed control line pathway configured to feed a control line through a rig; and a control line positioning apparatus;
wherein the enclosed control line pathway extends along and adjacent to a rig floor; and
wherein the enclosed control line pathway is configured to feed the control line to the control line positioning apparatus.

9. The control line apparatus of claim 8 wherein the enclosed control line pathway is disposed along a surface of the rig floor.

10. The control line apparatus of claim 8 wherein the enclosed control line pathway is disposed along a path substantially parallel with a plane of the rig floor.

11. The control line apparatus of claim 8 wherein the control line positioning apparatus comprises a movable arm, wherein the movable arm is configured to receive the control line.

12. The control line apparatus of claim 11 wherein the control line positioning apparatus further comprises an ascending control line pathway.

13. The control line apparatus of claim 11 wherein the control line positioning apparatus is configured to feed the control line adjacent to a pipe engaging apparatus.

14. The control line apparatus of claim 13 wherein the pipe engaging apparatus comprises a spider.

15. The control line apparatus of claim 8 wherein the enclosed control line pathway comprises an inlet.

16. The control line apparatus of claim 8 wherein a control line source is disposed beneath the rig floor.

17. The control line apparatus of claim 16 wherein the control line source comprises a control line storage reel.

18. A method of running control lines on a rig, comprising:
providing an enclosed pathway extending along and adjacent to a rig floor from a control line source to a pipe string;
disposing a control line within the enclosed pathway;
disposing the control line between the enclosed pathway and a control line positioning apparatus; and
moving the control line through the enclosed pathway.

19. The method of claim 18 further comprising:
positioning the control line adjacent to the pipe string to facilitate securing the control line to the pipe string.

20. The method of claim 18 wherein the pathway is disposed along a surface of the rig floor.

21. The method of claim 18 wherein the pathway is disposed within the rig floor.

22. The method of claim 18 wherein the pathway is disposed along a path substantially parallel with a plane of the rig floor.

23. The method of claim 18 wherein the pathway is disposed through an aperture formed in the rig floor.

24. The method of claim 23 wherein the pathway is disposed along a path substantially perpendicular with a plane of the rig floor.

25. The method of claim 24 wherein the control line source comprises a control line storage reel, the method further comprising:
disposing the control line storage reel beneath the rig floor.

26. The method of claim 18 wherein the pathway is disposed along a path substantially skewed from a plane of the rig floor.

27. A method to run a control line on a rig, comprising:
moving the control line away from a pipe string;
supporting the pipe string with a pipe engaging apparatus disposed on a rig floor;
connecting a pipe segment to the pipe string;
supporting the pipe string with an elevator assembly;
releasing the pipe string from the pipe engaging apparatus disposed on the rig floor;
providing an enclosed control line pathway between a control line source and the pipe string;
feeding the control line through the enclosed control line pathway to the pipe string; and
wherein the enclosed control line pathway extends along and adjacent to the rig floor.

28. The method of claim 27 further comprising:
moving the control line toward the pipe string with the control line positioning apparatus; and
securing the control line to the pipe string.

29. The method of claim 27 wherein the feeding comprises feeding the control line through the enclosed control line pathway as the pipe string is lowered into a borehole.

30. The method of claim 27 wherein the enclosed control line pathway is disposed along a path substantially parallel with a plane of the rig floor.

31. The method of claim 27 wherein the pipe engaging apparatus disposed on the rig floor comprises at least one of a spider and a collar load support apparatus.

32. A system to run a control line on a rig, comprising:
a pipe engaging apparatus disposed on a rig floor and configured to support a pipe string;
a control line positioning apparatus configured to move the control line at least one of toward and away from the pipe string;
an enclosed control line pathway configured to guide the control line from a control line source to the control line positioning apparatus; and
wherein the enclosed control line pathway extends along and adjacent to the rig floor.

33. The system of claim 32 wherein the enclosed control line pathway is disposed along a path substantially parallel with a plane of the rig floor.

34. A pathway within a drilling rig to protect one or more control lines to be attached to a pipe string, comprising:
an enclosed control line channel disposed adjacent to a rig floor, the enclosed control line channel having an inlet configured to receive the one or more control lines and an outlet configured to discharge the one or more control lines;
at least a portion of the enclosed control line channel having a bend portion configured to redirect the one or more control lines within the enclosed control line channel; and
a control line positioning apparatus configured to receive the one or more controls lines from the enclosed control line channel and configured to move the one or more control lines at least one of toward and away from the pipe string.

35. The pathway of claim 23, further comprising a pipe engaging apparatus configured to receive the one or more controls lines from the enclosed control line channel and configured to support the pipe string.

36. The pathway of claim 34, wherein at least a portion of the enclosed control line channel is configurable between an open position to reveal the one or more control lines and a closed position to substantially cover the one or more control lines.

37. The pathway of claim 34, wherein the bend portion comprises one or more control line engaging members.

38. The pathway of claim of claim 37, wherein the one or more control line engaging members comprises at least one of one or more slidably engaging members and one or more rollably engaging members.

39. The pathway of claim of claim 37, wherein the one or more control line engaging members comprises at least one of a sheave and a roller.

40. The pathway of claim 37, wherein the one or more control line engaging members are configured to be disposed intermediate two or more control lines fed from the inlet to the outlet within the enclosed control line channel.

41. The pathway of claim 37, wherein the one or more control line engaging members is coupled to a sensor configured to measure a load imparted to the one or more control line engaging members by the one or more control lines.

42. The pathway of claim 41, wherein the sensor is coupled to a display configured to indicate tension in the one or more control lines.

43. The pathway of claim 41, wherein the sensor is configured to generate an excess control line tension indication.

44. The pathway of claim 41, wherein the sensor is selected from a group comprising a load cell, a scale, and a strain gauge.

* * * * *

UNITED STATES PATENT AND TRADEMARK OFFICE
CERTIFICATE OF CORRECTION

PATENT NO. : 8,225,875 B2  
APPLICATION NO. : 12/113174  
DATED : July 24, 2012  
INVENTOR(S) : Brian David Begnaud et al.

Page 1 of 1

It is certified that error appears in the above-identified patent and that said Letters Patent is hereby corrected as shown below:

In the Claims:

In claim 35, column 24, line 53, "claim 23" should be -- claim 34 --.

Signed and Sealed this  
Second Day of October, 2012

David J. Kappos  
*Director of the United States Patent and Trademark Office*